(12) United States Patent
Murai et al.

(10) Patent No.: US 10,105,965 B2
(45) Date of Patent: Oct. 23, 2018

(54) INK JET PRINTING METHOD AND INK JET PRINTING APPARATUS

(71) Applicant: Seiko Epson Corporation, Tokyo (JP)

(72) Inventors: Masayuki Murai, Matsumoto (JP); Masakazu Ohashi, Shiojiri (JP); Toru Saito, Yamagata (JP)

(73) Assignee: Seiko Epson Corporation (JP)

( * ) Notice: Subject to any disclaimer, the term of this patent is extended or adjusted under 35 U.S.C. 154(b) by 34 days.

(21) Appl. No.: 15/133,380

(22) Filed: Apr. 20, 2016

(65) Prior Publication Data

US 2016/0311233 A1 Oct. 27, 2016

(30) Foreign Application Priority Data

Apr. 23, 2015 (JP) .................................. 2015-088119
Apr. 23, 2015 (JP) .................................. 2015-088120
(Continued)

(51) Int. Cl.
*B41J 2/20* (2006.01)
*B41J 3/407* (2006.01)
(Continued)

(52) U.S. Cl.
CPC ........... *B41J 3/4078* (2013.01); *C09D 11/102* (2013.01); *C09D 11/322* (2013.01); *D06P 5/30* (2013.01); *B41M 5/0047* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 7,052,117 B2 * 5/2006 Bibl ..................... B41J 2/14233
347/68
9,050,796 B2 6/2015 Saito et al.
(Continued)

FOREIGN PATENT DOCUMENTS

JP 2014-163021 A 9/2014

*Primary Examiner* — Manish S Shah
(74) *Attorney, Agent, or Firm* — Harness, Dickey & Pierce, P.L.C.

(57) ABSTRACT

An ink jet printing method includes attaching an ink composition to a cloth by using a printer head which has a nozzle discharging the ink composition, a pressure chamber for imparting pressure to the ink composition to cause the nozzle to discharge the ink composition, and a connection portion connecting the pressure chamber and the nozzle, and in which a distance of the connection portion is 500 μm or more, the distance of the connection portion being from a portion of the pressure chamber where the ink flows out from a pressure chamber to the nozzle side to the nozzle, in which the ink composition includes the resin as a solid content in the amount of 10% by mass to 26% by mass with respect to the ink composition, the ratio of the total content of the organic solvent to the total content of the solid content of the resin is 0.3 or more, and a sum of the total content of the solid content of the resin and the total content of the organic solvent is 37% by mass or less with respect to the ink composition.

8 Claims, 3 Drawing Sheets

(30) Foreign Application Priority Data

Aug. 10, 2015 (JP) ................................. 2015-157909
Aug. 10, 2015 (JP) ................................. 2015-157910

(51) Int. Cl.
*D06P 5/30* (2006.01)
*C09D 11/102* (2014.01)
*C09D 11/322* (2014.01)
*B41M 5/00* (2006.01)

(58) Field of Classification Search
CPC ...... B41J 2/1755; B41J 2/2114; B41J 2/2117;
B41J 2/2056; B41J 2/21; B41J 2/0057;
B41J 3/60; B41J 2002/012; B41J
2/04598; B41J 2/04588; B41J 2/04595;
B41J 2/04586; B41J 2/14274; B41J
11/0015; B41J 11/002; C09D 11/36;
C09D 11/40; C09D 11/30; C09D 11/38;
C09D 11/32; C09D 11/322; C09D
11/324; C09D 11/328; C09D 11/101;
C09D 11/005; C09D 11/54; C09D 11/52;
B41M 5/0011; B41M 5/0017; B41M
7/00; B41M 7/0072; B41M 5/52; B41M
5/5218
See application file for complete search history.

(56) References Cited

U.S. PATENT DOCUMENTS

| 2014/0210901 A1* | 7/2014 | Ohashi | ...................... D06P 5/30 347/20 |
| 2014/0362142 A1* | 12/2014 | Takaai | ................. B41J 2/14201 347/71 |
| 2015/0267064 A1 | 9/2015 | Saito et al. | |

* cited by examiner

INK JET PRINTING METHOD AND INK JET PRINTING APPARATUS

BACKGROUND

1. Technical Field

The present invention relates to an ink jet printing method and an ink jet printing apparatus.

2. Related Art

In the related art, a printing method, in which an image is recorded on a cloth such as a woven fabric, a knitted fabric and a non-woven fabric, has been known. In recent years, from a viewpoint of being able to use an ink used for printing effectively, the use of an ink jet recording method is being reviewed. In the ink jet printing method using this ink jet recording method, an ink in a shape of a liquid droplet is discharged from nozzles of a head and attached to the cloth to form an image of an ink coated film on the cloth.

The ink used for this ink jet printing method includes, for example, a coloring material such as a pigment or a dye, a dispersant (a surfactant) and a solvent (water, an organic solvent, or the like). Here, if the dye is used for a coloring material, there is a tendency that properties of the recorded image, such as light resistance, are not excellent. Thus, the pigment may be used as the coloring material. In a case where the pigment is used as the coloring material, it is necessary to add a resin for fixing an ink in order to fix the pigment on the cloth.

However, in a case where the pigment is used as the coloring material, if the ink amount of the ink droplet is reduced in order to obtain an image with a high resolution and high quality or to further increase a drying rate, there is a problem: the ink droplet tends to remain on a fuzz of the cloth, aggregation unevenness or bleeding occurs, or image concealment is deteriorated. For example, JPA-2014-163021 discloses, as a pigment printing ink jet recording method in which a contamination of the cloth is suppressed and the concealment of the obtained image and drying rate are excellent, a technology in which a pigment printing ink composition at least including a pigment as the coloring material is discharged from a nozzle opening, as an ink droplet of which the ink amount of an ink droplet is 9 ng or less, such that the average discharging rate V at a distance of 0.5 mm to 1.0 mm in the cloth direction from the nozzle opening is 5 m/s or higher; and the pigment printing ink composition is attached to the cloth.

However, if a large amount of a fixing resin is included in the ink in order to enhance adhesion (washing fastness) of the ink to the cloth, the ink may become dried from a nozzle surface and a problem of intermittency occurs. In particular, an ink jet head which has been used for the pigment printing ink jet recording method in the related art is configured such that a nozzle hole and a pressure chamber are directly connected to each other without going through a communicating hole. Therefore, if the intention is to increase washing fastness by increasing the amount of the fixing resin in the ink, the ink tends to become dried from the nozzle surface and a major problem of intermittency occurs.

In a case where a white ink is used as the ink, since the white ink is frequently used for recording a base image on a dark color cloth, the content of a pigment in the ink is increased in order to secure the image concealment. Since it is necessary to increase the content of a resin in the white ink corresponding to the increase in the content of the pigment from a viewpoint of washing fastness of the obtained ink coated film, in a case where the white ink is used, the ink attachment amount on the cloth is increased. Therefore, in a case where the white ink is used, an increase in the amount of a mist at the time of discharging contaminates the nozzle surface or strike through of the ink occurs, which may deteriorate color developing properties.

SUMMARY

Therefore, an advantage of some aspects of the invention, by solving at least part of the aforementioned problem, is to provide an ink jet printing method, in which an ink jet printed matter having excellent washing fastness of the obtained ink coated film can be provided without impairing intermittency, when a pigment ink is imparted on a cloth by an ink jet method; and an ink jet printing apparatus for executing the method.

If a large amount of the fixing resin is included in the ink in order to enhance adhesion (washing fastness) of the ink on the cloth, the ink may become dried from the nozzle surface and a problem of intermittency occurs. In particular, an ink jet head which has been used for the pigment printing ink jet recording method in the related art is configured such that a nozzle hole and a pressure chamber are directly connected to each other without going through a communicating hole. Therefore, if the intention is to increase washing fastness by increasing the amount of the fixing resin in the ink, the ink tends to become dried from the nozzle surface and a major problem of intermittency occurs.

In addition, in a case where a non-white ink such as a color ink is used as the ink, since the attachment amount is small compared to that of the white ink, the attachment amount of the resin is sufficient and there is a tendency that washing fastness is decreased. In addition, in a case where the non-white ink is used, since the non-white ink is used for recording a picture or a letter, a clear image having no bleeding and excellent color developing properties is required.

Therefore, an advantage of some aspects of the invention, by solving at least part of the aforementioned problem, is to provide an ink jet printing method, in which an ink jet printed matter having excellent washing fastness of the obtained ink coated film can be provided without impairing intermittency, when a pigment ink is imparted on a cloth by an ink jet method; and an ink jet printing apparatus for executing the method.

The invention can be realized in the following aspects or application examples.

Application Example 1

According to an aspect of the invention, there is provided an ink jet printing method including: attaching an ink composition to a cloth by using a printer head which has a nozzle discharging the ink composition, a pressure chamber for imparting pressure to the ink composition to cause the nozzle to discharge the ink composition, and a connection portion connecting the pressure chamber and the nozzle, and in which a distance of the connection portion is 500 μm or more, the distance of the connection portion being from a portion of the pressure chamber where the ink flows out from a pressure chamber to the nozzle side to the nozzle.

The ink composition includes the resin as a solid content in the amount of 10% by mass to 26% by mass with respect to the ink composition, the ratio of the total content of the organic solvent to the total content of the solid content of the resin is 0.3 or more, and a sum of the total content of the solid content of the resin and the total content of the organic solvent is 37% by mass or less with respect to the ink composition.

According to the ink jet printing method of Application Example 1, by preventing the ink from the nozzle surface from becoming dried when the pigment ink is imparted to the cloth by the ink jet method, it is possible to provide the ink jet printed matter having excellent washing fastness of the obtained ink coated film without impairing intermittency. In addition, in a case where the content of the resin in the white ink as the ink is increased, the increase in the amount of mist at the time of discharging can prevent a contamination of the nozzle surface or strike through of the ink and the ink jet printed matter having color developing properties can be provided.

Application Example 2

In the ink jet printing method according to Application Example 1, in the attaching of the ink composition, the maximum mass may be 30 ng or less per one ink droplet of the discharged ink composition.

Application Example 3

In the ink jet printing method according to Application Example 1 or 2, in the printer head, the total capacity of the pressure chamber per pressure chamber and the connection portion may be 4200 pl to 6200 pl.

Application Example 4

In the ink jet printing method according to any one of Application Examples 1 to 3, the capacity of the pressure chamber per pressure chamber may be 3700 pl or less.

Application Example 5

In the ink jet printing method according to any one of Application Examples 1 to 4, the printer head may include a communicating plate provided with a communicating hole which configures a part of the connection portion.

Application Example 6

The ink jet printing method according to any one of Application Examples 1 to 5 may further include attaching a reaction liquid including an aggregating agent for aggregating or thickening a component of the ink composition to the cloth.

Application Example 7

In the ink jet printing method according to any one of Application Examples 1 to 6, the ink composition may be a white ink composition including a white pigment.

Application Example 8

In the ink jet printing method according to any one of Application Examples 1 to 7, the printer head may include a plurality of nozzles discharging the ink composition in a row, and the nozzle density in the row direction may be 200 dpi or more.

Application Example 9

In the ink jet printing method according to any one of Application Examples 1 to 8, the maximum ink attachment amount to the cloth may be 100 mg/inch$^2$ or more.

Application Example 10

According to another aspect of the invention, there is provided an ink jet printing apparatus for performing printing by the ink jet printing method according to any one of Application Examples 1 to 9.

The invention can be realized in the following aspects or application examples.

Application Example 11

According to an aspect of the invention, there is provided an ink jet printing method including: attaching an ink composition to a cloth by using a printer head which has a nozzle discharging the ink composition, a pressure chamber for imparting pressure to the ink composition to cause the nozzle to discharge the ink composition, and a connection portion connecting the pressure chamber and the nozzle, and in which a distance of the connection portion is 500 μm or more, the distance of the connection portion being from a portion of the pressure chamber where the ink flows out from a pressure chamber to the nozzle side to the nozzle.

The ink composition includes a resin and an organic solvent.

According to the ink jet printing method of Application Example 11, by preventing the ink from the nozzle surface from becoming dried when the pigment ink is imparted to the cloth by the ink jet method, it is possible to provide the ink jet printed matter having excellent washing fastness of the obtained ink coated film without impairing intermittency. In addition, in a case where the non-white ink such as a color ink is used as the ink, it is possible to provide an ink jet printed matter having excellent washing fastness and color developing properties without bleeding.

Application Example 12

In the ink jet printing method according to Application Example 11, the ink composition may include the resin as a solid content in the amount of 3% by mass to 13% by mass with respect to the ink composition, the ratio of the total content of the organic solvent to the total content of the solid content of the resin may be 0.7 or more, and a sum of the total content of the solid content of the resin and the total content of the organic solvent may be 35% by mass or less with respect to the ink composition.

Application Example 13

In the ink jet printing method according to Application Example 11 or 12, in the attaching of the ink composition, the maximum mass may be 30 ng or less per one ink droplet of the discharged ink composition.

Application Example 14

In the ink jet printing method according to any one of Application Examples 11 to 13, in the printer head, the total capacity of the pressure chamber per pressure chamber and the connection portion may be 4200 pl to 6200 pl.

Application Example 15

In the ink jet printing method according to any one of Application Examples 11 to 14, in which the capacity of the pressure chamber per pressure chamber may be 3700 pl or less.

Application Example 16

In the ink jet printing method according to any one of Application Examples 11 to 15, the printer head may include a communicating plate provided with a communicating hole which configures a part of the connection portion.

Application Example 17

The ink jet printing method according to any one of Application Examples 11 to 16 may further include attaching a reaction liquid including an aggregating agent for aggregating or thickening a component of the ink composition to the cloth.

Application Example 18

In the ink jet printing method according to any one of Application Examples 11 to 17, the ink composition may be a non-white ink composition including a non-white pigment.

Application Example 19

In the ink jet printing method according to any one of Application Examples 11 to 18, the printer head may include a plurality of nozzles discharging the ink composition in a row, and the nozzle density in the row direction may be 200 dpi or more.

Application Example 20

In the ink jet printing method according to any one of Application Examples 11 to 19, the maximum ink attachment amount to the cloth may be 40 mg/inch$^2$ or less.

Application Example 21

According to another aspect of the invention, there is provided an ink jet printing apparatus for performing printing by the ink jet printing method according to any one of Application Examples 11 to 20.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
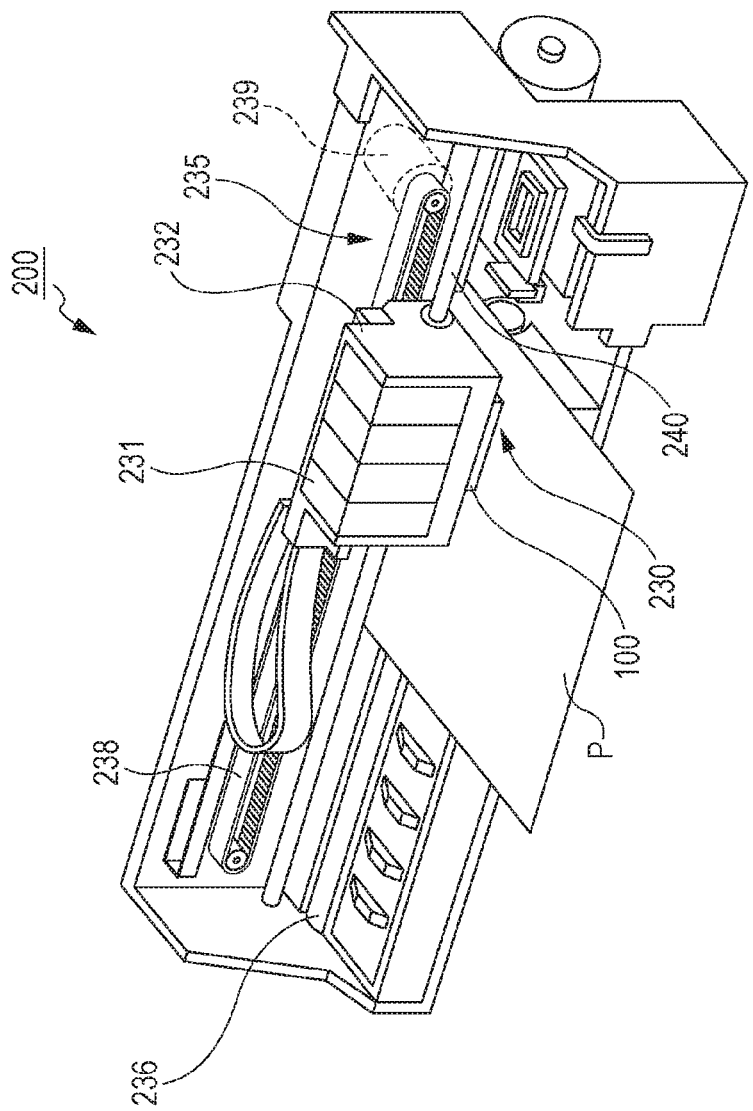
FIG. 1 is a perspective view schematically illustrating an ink jet printing apparatus according to an embodiment.

Hereinafter, some embodiments of the first invention will be described. The embodiments described below are describing one example of the invention. The invention is not limited to the following embodiments and includes various modifications which are executed within the range not departing from the gist of the invention. In addition, the entirety of the configuration described below is not necessarily the essential configuration of the invention.

1. Ink Jet Printing Method

The ink jet printing method according to the embodiment of the invention includes attaching an ink composition to a cloth by using a printer head which has a nozzle discharging the ink composition, a pressure chamber for imparting pressure to the ink composition to cause the nozzle to discharge the ink composition, and a connection portion connecting the pressure chamber and the nozzle, and in which a distance of the connection portion is 500 μm or more, the distance of the connection portion being from a portion of the pressure chamber where the ink flows out from a pressure chamber to the nozzle side to the nozzle, in which the ink composition includes the resin as a solid content in the amount of 10% by mass to 26% by mass with respect to the ink composition, the ratio of the total content of the organic solvent to the total content of the solid content of the resin is 0.3 or more, and a sum of the total content of the solid content of the resin and the total content of the organic solvent is 37% by mass or less with respect to the ink composition.

Hereinafter, a configuration of the apparatus which can execute the ink jet printing method according to the embodiment and an ink composition will be described in order. Then, a step of the ink jet printing method will be described in detail.

1.1. Apparatus Configuration

The ink jet printing apparatus according to the embodiment, as described above, includes a printer head which has a nozzle discharging an ink composition, a pressure chamber for imparting pressure to the ink composition to cause the nozzle to discharge the ink composition, and a connection portion connecting the pressure chamber and the nozzle, and in which a distance of the connection portion is 500 μm or more, the distance of the connection portion being from a portion of the pressure chamber where the ink flows out from a pressure chamber to the nozzle side to the nozzle.

Below, an on-carriage type printer to which an ink cartridge is installed to a carriage is exemplified as the ink jet printing apparatus according to the embodiment; however, the ink jet printing apparatus according to the invention is not limited to the on-carriage type printer and may be an off-carriage type printer in which the ink cartridge is fixed outside without being installed to the carriage.

In addition, the printer described below is a serial printer, in which a printer head is installed to the carriage moving in a predetermined direction and a liquid droplet is discharged on a recording medium as the head is moved by the movement of the carriage. The ink jet printing apparatus according to the invention is not limited to a serial printer, and may be a line printer, in which the head is formed larger than the width of the recording medium and the liquid droplet is discharged on the recording medium without the printer head being moved.

In respective drawings described below, a scale of various members is appropriately changed in order to obtain a size in which the various members can be recognized.

FIG. 1 is a perspective view schematically illustrating a printer 200, which is one example of the ink jet printing apparatus according to the embodiment. The printer 200 performs ink jet printing on a cloth P as a recording medium.

As illustrated in FIG. 1, the printer 200 includes a printer head 100, a carriage 232 in which the printer head 100 is installed and an ink cartridge 231 is detachably mounted, a main scanning mechanism 235 which causes the carriage 232 to reciprocate in a medium width direction, and a platen roller 236 which transports a recording medium to a medium transportation direction. The printer 200 further includes a control portion (not illustrated) which controls the entire operation of the printer 200. Here, the medium width direction is a main scanning direction (head scanning direction), and the medium transportation direction is a sub-scanning direction (direction intersecting the main scanning direction).

The main scanning mechanism 235 includes a timing belt 238 connected to the carriage 232, a motor 239 driving the timing belt 238, and a guide shaft 240 provided in the main scanning direction, which is a support member. The carriage 232 is driven by the motor 239 via the timing belt 238, and reciprocates in the main scanning direction along the guide shaft 240. When the carriage reciprocates, an ink is discharged from the printer head 100 at a predetermined timing and printing is performed on the cloth P.

A belt unit 230 has an ink jet type recording head (hereinafter, simply referred to as a "head" or a "printer head") configured by the printer head 100 described below. The belt unit 230 further includes an ink cartridge 231 supplying an ink to the printer head 100 and a carriage 232 installed with the printer head 100 and the ink cartridge 231.

In the embodiment, an example, in which printing is performed while both the printer head 100 and the cloth P are moved, is shown. However, the printer 200 may be a mechanism in which printing is performed on the cloth P while positions of the printer head 100 and the cloth P are relatively changed to each other.

In addition, the exemplified printer 200 has one printer head 100, and printing is performed on the cloth P by this printer head 100. However, the printer may include a plurality of printer heads. In a case where the printer 200 includes a plurality of printer heads, each of the plurality of printer heads may be independently operated as described above and the plurality of printer heads are linked to each other to form one integrated head. As this integrated head, a line type head, in which each nozzle hole of the plurality of heads has an equivalent interval in entirety, can be exemplified.

1.1.1. Printer Head

Figure 2:
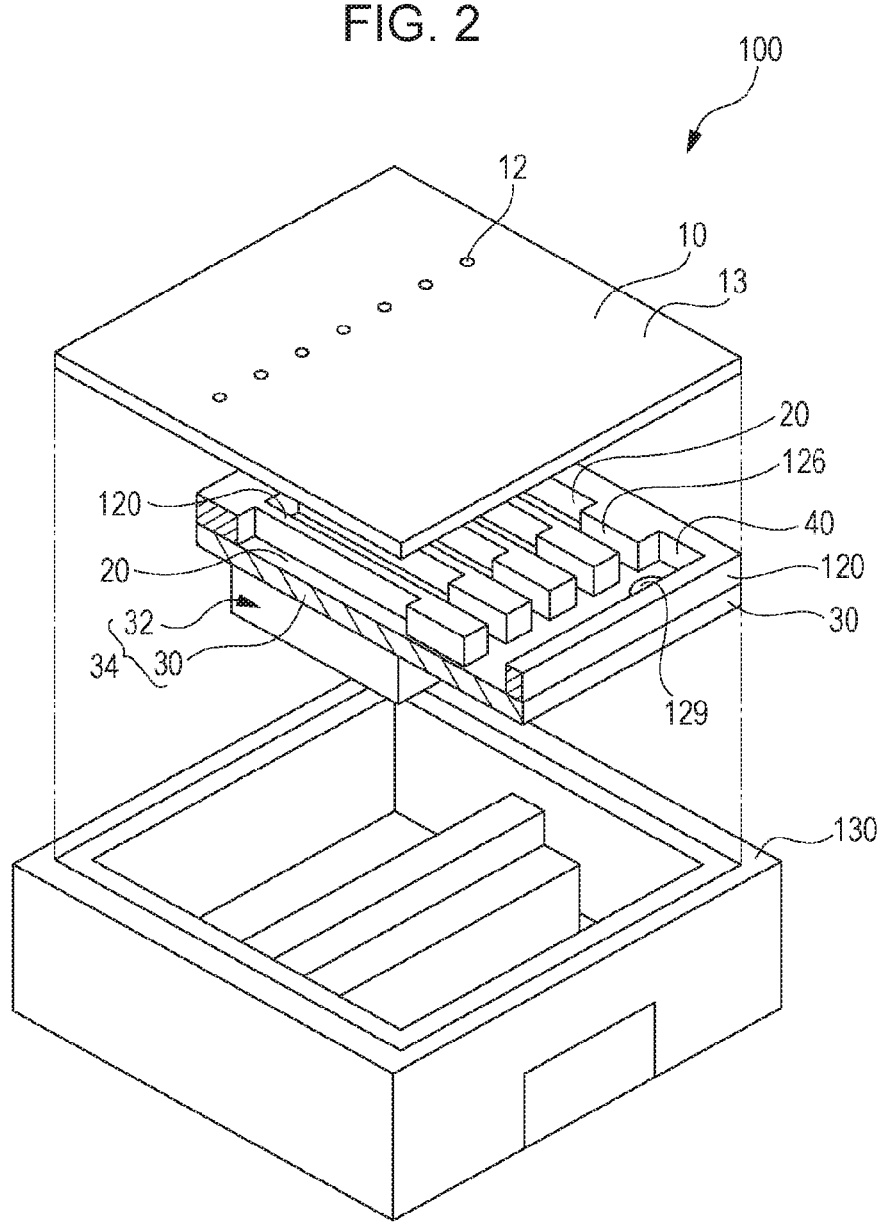
FIG. 2 is an exploded perspective view schematically illustrating a head according to the embodiment.
Figure 3:
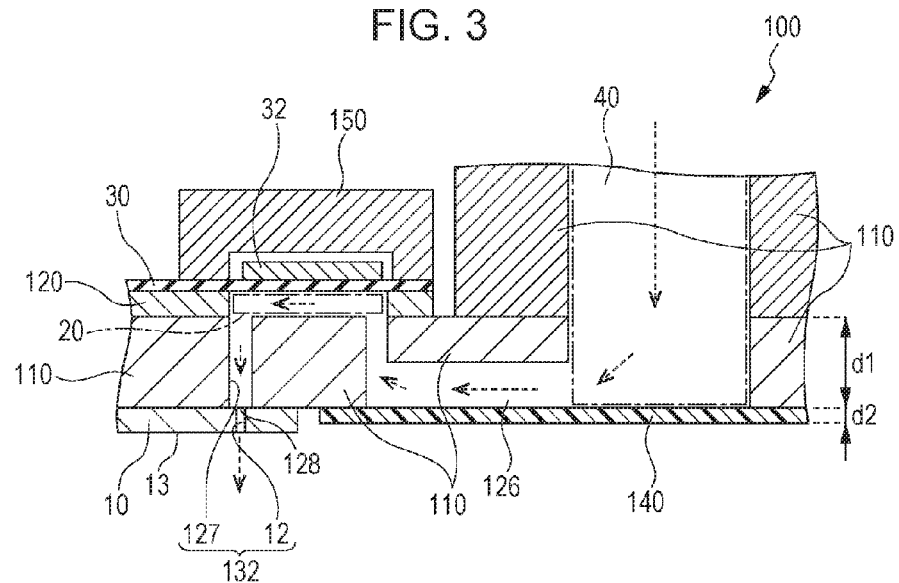
FIG. 3 is a cross-sectional view schematically illustrating main portions of the head of the embodiment.

FIG. 2 is an exploded perspective view schematically illustrating the printer head 100 in the printer 200 and shows the state where the upside of the printer head installed in the printer 200 illustrated in FIG. 1 is facing down. FIG. 3 is a cross-sectional view schematically illustrating main portions of the printer head 100 and schematically shows the flow of an ink from an ink supply chamber 40 to a nozzle hole 12 with a dashed line with arrows at the time of discharging operation of the ink.

A piezoelectric element 32 is simply illustrated in FIGS. 2 and 3. In addition, in the embodiment, the printer head 100 is configured to include a communicating plate 110 and a cover 150 but they are omitted in FIG. 2.

As illustrated in FIG. 2, the printer head 100 includes a nozzle plate 10 having a plurality of nozzle holes 12 on the surface facing the cloth P, which is a recording medium, a plurality of pressure chambers 20 respectively communicating with the plurality of nozzle holes 12 formed on the nozzle plate 10, a vibrating plate 30 for changing the capacity of each of the plurality of pressure chambers 20, an ink supply chamber 40 for supplying an ink to the plurality of pressure chambers 20, and a housing 130.

The nozzle plate 10 has the plurality of nozzle holes 12 for discharging an ink, these plurality of nozzle holes 12 are arranged in a row, and a nozzle surface 13 is formed on the surface of the nozzle plate 10. The number of nozzle holes 12 provided on the nozzle plate 10 is not particularly limited. In the printer head 100 used in the embodiment, the nozzle density in a row direction of the nozzle hole 12 is preferably 200 dpi or more. In other words, the interval between the nozzle hole 12 and the adjacent arranged nozzle hole 12 is preferably 127 μm or less. As the nozzle density is set to 200 dpi or more, the total ink ejection quantity can be maintained and the image concealment can be maintained, even in a case where the liquid droplet becomes minute. The nozzle density is more preferably 240 dpi or more and still more preferably 250 dpi or more, and more preferably 300 dpi or more, still more preferably 400 dpi or more, and most preferably 500 dpi or more. The upper limit of the nozzle density is preferably 2000 dpi or less and more preferably 1000 dpi or less.

Examples of the material of the nozzle plate 10 include silicon, stainless steel (SUS), and the like. In addition, if the material of the nozzle plate 10 is an alloy including iron (Fe) as a main component (50% or more) and chromium (Cr) in the amount of 10.5% or more, it is possible to obtain rigidity and prevent rust at the same time, which is more preferable. The thickness of the nozzle plate 10 is not particularly limited, and for example, the thickness thereof is preferably 50 μm or less, more preferably 20 μm or less, and still more preferably 1 μm to 10 μm.

The printer head 100 includes a pressure chamber substrate 120 for forming a pressure chamber 20 and examples of the material of the pressure chamber substrate 120 include silicon and the like. As illustrated in FIG. 3, the pressure chamber substrate 120 includes a communicating plate 110 as a channel forming substrate between the nozzle plate 10 and the pressure chamber substrate. As the communicating plate 110 divides a space between the nozzle plate 10 and the pressure chamber substrate 120, the ink supply chamber 40 (liquid storage portion), a supply port 126 communicating with the ink supply chamber 40, and the pressure chamber 20 communicating with the supply port 126 are formed. In other words, the ink supply chamber 40, the supply port 126 and the pressure chamber 20 are divided by the nozzle plate 10, the communicating plate 110, the pressure chamber substrate 120, and the vibrating plate 30.

The communicating plate 110 has a communicating hole 127 communicating with the nozzle hole 12 from the pressure chamber 20. A discharge port 128 of the ink is formed on the end portion of the communicating hole 127 formed on the surface where the communicating plate 110 is in contact with the nozzle plate 10. The discharge port 128 communicates with the nozzle hole 12 formed on the nozzle plate 10.

The vibrating plate 30 is provided to be in contact with the pressure chamber substrate 120 and the piezoelectric element 32 is formed to be in contact with the vibrating plate 30. The piezoelectric element 32 is electrically connected to a piezoelectric element driving circuit (not illustrated) and can be operated (vibrated or deformed) based on a signal of the piezoelectric element driving circuit. The vibrating plate 30 is deformed by the operation of the piezoelectric element 32 and internal pressure of the pressure chamber 20 can be changed by changing the capacity of the pressure chamber 20. The piezoelectric element 32 is not particularly limited and a type of the element (electromechanical transducer), which is deformed by the application of a voltage, can be exemplified. As such, in the embodiment, a piezoelectric actuator 34 is configured to include the piezoelectric element 32 and the vibrating plate 30.

In this example, the pressure chamber 20 is divided by the communicating plate 110, the pressure chamber substrate 120 and the vibrating plate 30, but the pressure chamber 20 can be formed by an appropriate member as long as the capacity can be changed by the vibration of the vibrating plate 30. Thus, the number, shape, and material of the member are optional. In addition, the vibrating plate 30 may be integral with an electrode (for example, formed of Pt, or the like) configuring the piezoelectric element 32.

Since the interval between the nozzle holes 12 is 127 μm or less, the printer head 100 of the embodiment preferably has a configuration including the piezoelectric element 32, in which a piezoelectric material is arranged between two electrodes. In other words, for example, an aspect of the piezoelectric actuator 34 is preferably a thin film, in which one electrode, a layer of the piezoelectric material (for example, lead zirconate titanate (PZT)), and the other electrode are laminated in order with respect to the vibrating plate 30, in entirety.

The material of the vibrating plate 30 is not particularly limited and examples thereof include silicon oxide ($SiO_2$), silicon nitride (SiN), silicon oxynitride (SiON), zirconium oxide ($ZrO_2$), titanium oxide ($TiO_2$), silicon carbide (SiC), and a laminate of the layer formed of these materials. The material of the vibrating plate 30 having a Young's modulus of 250 GPa or less is more preferable, from a viewpoint of being able to cause a large displacement and hardly cause damage. For example, the material is preferably formed by including $ZrO_2$ (150 GPa), $SiO_2$ (75 GPa), Si (130 GPa), SUS (199 GPa), and Cr (248 GPa) (the value inside the parenthesis is Young's modulus). In addition, in a case where the electrode of the piezoelectric element 32 is formed of Pt and laminated integrally with the vibrating plate 30, since the Young's modulus of Pt is 168 GPa and $ZrO_2$ is 150 GPa, even if they are combined, the total is 250 GPa or less. Thus, the above configuration may be allowed.

In the specification, Young's modulus indicates Young's modulus measured in a static test (JIS G0567J, or the like) (mechanical test), and for example, is measured by using a No. II-6 specimen.

Further, the printer head 100 includes a compliance sheet 140 as a member for forming a part of the ink channel and a cover 150 accommodating the piezoelectric element 32. A supply port 126 communicating with the ink supply chamber is formed between the compliance sheet 140 and the communicating plate 110. In addition, the compliance sheet 140 is a flexible and elastic film, and has a function as a damper for discharging or circulating an ink, and a function of suppressing damage of the printer head 100 by deformation, in a case where the volume of the ink is increased.

The compliance sheet 140 is not particularly limited as long as the sheet is a film having elasticity and for example, a polymer film, a thin metal film, a glass fiber, a carbon fiber, or the like are used. The material of the polymer film is not particularly limited and examples thereof include polyimide, nylon, polyolefin, and polyphenylene sulfite. It is preferable to form the compliance sheet with polyphenylene sulfite. In addition, examples of the metal include a material including iron or aluminium.

The thickness of the compliance sheet 140 is not particularly limited and for example, is preferably 50 μm or less, more preferably 20 μm or less, and still more preferably 1 μm to 10 μm. If the compliance sheet 140 is too thin, vibration at the time of discharging the ink becomes severe and residual vibration may frequently occur.

In the embodiment, the ink supply chamber 40, the supply port 126, the pressure chamber 20 and the communicating hole 127 are described separately, but these are all liquid channels. As long as the pressure chamber 20 is formed, the channels may be designed in any way. For example, the supply port 126 has a shape in which a part of the channel is narrowed in the illustrated example, but the expansion and contraction of the channels can be optional according to the design, which are not entirely essential in the configuration.

The pressure chamber 20 formed by the aforementioned configuration is a space divided by the communicating plate 110, the pressure chamber substrate 120, and the vibrating plate 30, and refers to a space not including the supply port 126, the communicating hole 127, the discharge port 128, and the nozzle hole 12. That is, a space facing a portion for imparting pressure to the ink of the vibrating plate 30, the pressure chamber substrate 120, and the communicating plate 110, and a space (a portion where deformation or heat is generated in the wall of the pressure chamber 20) which is adjacent to this space and in which the cross-sectional area of the cross section facing the ink flowing direction is equal to that of this space is determined as the pressure chamber 20, and the capacity of the pressure chamber 20 is the capacity of this space. As described above, the pressure chamber 20 is a space of which the capacity is changed by displacement of the vibrating plate 30 and is defined as a space not including narrow channels or the like communicating with the space.

As described above, the pressure chamber 20 and the nozzle hole 12 are communicated with each other by the communicating hole 127. In the invention, a portion from the portion where the ink flows out from the pressure chamber to the nozzle side to the nozzle, in other words, in the example of FIG. 3, the communicating hole 127, the nozzle hole 12, and the entire portion connecting these are defined as a connection portion 132. Therefore, in the example of FIG. 3, since the connection portion 132 is provided so as to penetrate the communicating plate 110 in parallel in the thickness direction, the distance of the connection portion 132 is equal to the sum of the length d1 of the communicating plate 110 in the thickness direction and the length d2 of the nozzle plate 10 in the thickness direction.

In this embodiment, the sum of the length d1 of the communicating plate 110 in the thickness direction and the length d2 of the nozzle plate 10 in the thickness direction, in other words, d1+d2 is 500 μm or more. As such, since the connection portion 132 is configured to have a long distance, it is possible to prevent the ink from becoming dried from the nozzle surface 13. By doing this, even in a case where the content of the resin in the ink is increased in order to increase washing fastness of the ink coated film, intermittency is not impaired. Also, even in a case where the content of the resin in a white ink as the ink is increased, a contamination of the nozzle surface 13 or strike through of the ink caused by an increase in a mist at the time of discharging can be prevented and the ink jet printed matter having excellent color developing properties can be provided.

In the example of FIG. 3, the nozzle plate 10 and the communicating plate 110 are laminated and the nozzle hole 12 and the communicating hole 127 are formed of a different member; however, the nozzle plate and the communicating plate may be formed of a single member. Even in a case where the nozzle plate and the communicating plate are formed of a single member, the connection portion 132 refers to a portion from the portion where the ink flows out from the pressure chamber to the nozzle side to the nozzle. Even in this case, since the distance of the connection portion is 500 µm or more, it is possible to prevent the ink from becoming dried from the nozzle surface.

The distance of the connection portion 132 is preferably 500 µm to 3000 µm, more preferably 700 µm to 2500 µm, and still more preferably 900 µm to 1500 µm. Even in a case where the communicating hole is obliquely elongated with respect to the nozzle plate 10, the length of the communicating hole is the length along the communicating hole. In this case, the length of the communicating hole becomes longer than the length d1 of the communicating plate 110 in the thickness direction. That is, the shortest distance from a boundary between the pressure chamber 20 and the communicating hole to the nozzle hole 12 through the communicating hole is determined as the length of the communicating hole, and the distance of the connection portion is the distance in which the length of the nozzle hole 12 and the entire portion connecting these is added to the length of the communicating hole.

The total capacity of a pressure chamber per pressure chamber and the connection portion, in other words, in the embodiment, the total capacity of the pressure chamber 20, the communicating hole 127, and the nozzle hole 12 is preferably 4200 pl to 6200 pl and more preferably 4500 pl to 5500 pl. In this case, it is possible to prevent the ink from becoming dried from the nozzle surface 13.

In this case, the capacity per one pressure chamber 20 is preferably 3700 pl or less and more preferably 3500 pl or less. The capacity is still more preferably 3300 pl or less and particularly preferably 3000 pl or less. The lower limit of the capacity per one pressure chamber 20 is preferably 1500 pl or more and more preferably 2000 pl or more. Since the capacity of the pressure chamber 20 is 3700 pl or less, it is possible to secure the capacity of the communicating hole 127 sufficiently. Thus, it is possible to effectively prevent the ink from becoming dried from the nozzle surface 13.

The ink supply chamber 40 can temporarily store the ink supplied from the outside (for example, an ink cartridge) via a through hole 129 provided in the vibrating plate 30. The ink in the ink supply chamber 40 can be supplied to the pressure chamber 20 via the supply port 126. The capacity of the pressure chamber 20 can be changed by deformation of the vibrating plate 30. The pressure chamber communicates with the nozzle hole 12 via the communicating hole 127, and as the capacity of the pressure chamber 20 is changed, the ink is discharged from the nozzle hole 12 or the ink is introduced from the ink supply chamber 40 to the pressure chamber 20. Here, the nozzle size of the nozzle hole 12 is preferably 5 µm to 100 µm, more preferably 10 µm to 60 µm, and still more preferably 10 µm to 40 µm, from a viewpoint of obtaining excellent image quality, intermittency, or reducing the mist.

As illustrated in FIG. 2, the housing 130 can accommodate the nozzle plate 10, the pressure chamber substrate 120 and the piezoelectric element 32. As a material of the housing 130, a resin, a metal, or the like can be exemplified. The housing 130 may have a function to separate the piezoelectric element 32 from the outside environment. Also, an inert gas may be sealed in the housing 130 or pressure within the housing 130 may be reduced. By doing this, it is possible to suppress deterioration of the piezoelectric material.

The cover 150 is configured as a member separate from the housing 130. The cover 150 is provided so as to be in contact with the vibrating plate 30, forms a space for accommodating the piezoelectric element 32, and accommodates the piezoelectric element 32 in this space. A material of the cover 150 is the same as the aforementioned material of the housing 130. The aforementioned housing 130 is a cover covering the piezoelectric element 32, but the cover 150 has a function of separating the piezoelectric element 32 from the outside environment. An inert gas may be sealed in the space formed by the cover 150 or pressure of the space may be reduced. By doing this, it is possible to suppress deterioration of the piezoelectric material of the piezoelectric element 32. In this case, the housing 130 may have a function as a support of the printer head 100.

In a case where the printer head 100 of the embodiment exemplified above is installed in the printer 200, the nozzle plate 10 is disposed toward the cloth P, so that the nozzle plate 10 becomes in direct contact with the air (outside air). Also, since the printer head 100 of the embodiment has the housing 130 and the cover 150, the piezoelectric element 32 and the vibrating plate 30 are configured not to be in contact with the outside air substantially.

Here, the ink jet printing apparatus of the embodiment performs an ink jet printing method by using an ink composition described below.

1.2. Ink Composition

The ink composition used in the ink jet printing method according to the embodiment of the invention includes a resin as a solid content in the amount of 10% by mass to 26% by mass with respect to the ink composition, the ratio of the total content of the organic solvent to the total content of the solid content of the resin is 0.3 or more, and a sum of the total content of the solid content of the resin and the total content of the organic solvent is 37% by mass or less with respect to the ink composition.

Hereinafter, a component included in the ink composition (hereinafter, also simply referred to as an "ink") used for the ink jet printing method according to the embodiment will be described in detail.

1.2.1. Pigment

The ink used for the ink jet printing method according to the embodiment includes a pigment. As the pigment, either an organic pigment or an inorganic pigment can be used and a pigment in any color can be used.

For example, a white color-based pigment is not limited to the following and examples thereof include a white inorganic pigment such as titanium oxide, zinc oxide, zinc sulfide, antimony oxide, and zirconium oxide. A white organic pigment such as white hollow resin particles and polymer particles can be used, in addition to the white inorganic pigment.

A color index (C.I.) of the white color-based pigment is not limited to the following and examples thereof include C.I. pigment white 1 (basic lead carbonate), 4 (zinc oxide), 5 (a mixture of zinc sulfide and barium sulfate), 6 (titanium oxide), 6:1 (titanium oxide including other metal oxides), 7 (zinc sulfide), 18 (calcium carbonate), 19 (clay), (mica titanium), 21 (barium sulfate), 22 (natural barium sulfate), 23 (gloss white), 24 (alumina white), 25 (plaster), (magnesium oxide•silicon oxide), 27 (silica), and 28 (anhydrous calcium silicate). Among these, titanium oxide is preferable since color developing properties, concealment, and visibility (brightness) are excellent and a satisfactory dispersed particle diameter is obtained.

Among the aforementioned titanium oxide, a general rutile type titanium oxide is preferable as the white color-based pigment. This rutile type titanium oxide may be manufactured by oneself or may be the one commercially available. As an industrial manufacturing method in a case where the rutile type titanium oxide (powder form) is manufactured by oneself, the well-known sulfuric acid method and a chlorine method can be exemplified. Examples of the rutile type titanium oxide include rutile types such as Tipaque (registered trade mark) CR-60-2, CR-67, R-980, R-780, R-850, R-980, R-630, R-670, and PF-736 (the above are manufacture by ISHIHARA SANGYO KAISHA, LTD., trade name).

The ink used in the embodiment may include a pigment other than the white color-based pigment. The pigment other than the white color-based pigment refers to a pigment excluding the aforementioned white color-based pigment. The pigment other than the white color-based pigment is not particularly limited below and for example, an organic pigment such as an azo-based pigment, a phthalocyanine-based pigment, a dye-based pigment, a condensed polycyclic pigment, a nitro-based pigment, and a nitroso-based pigment (brilliant carmine 6B, lake red C, watching red, disazo yellow, hansa yellow, phthalocyanine blue, phthalocyanine green, alkali blue, and aniline black); metals such as cobalt, iron, chromium, copper, zinc, lead, titanium, vanadium, manganese, and nickel, and metal oxides and sulfides; carbon blacks (C.I. pigment black 7) such as furnace carbon black, lamp black, acetylene black, and channel black; and an inorganic pigment such as yellow soil, ultramarine blue, and iron blue can be used.

Further specifically, examples of the carbon black which can be used as a black-based pigment include MCF88, No. 2300, 2200B, 900, 33, 40, 45, 52, MA7, 8, 100 (the above are manufactured by Mitsubishi Chemical Corporation, trade name), Raven 5750, 5250, 5000, 3500, 1255, 700 (the above are manufactured by Columbia Carbon Co., Ltd., trade name), Regal 400R, 330R, 660R, Mogul L, Monarch 700, 800, 880, 900, 1000, 1100, 1300, 1400 (the above are manufactured by Cabot Corporation, trade name), Color Black FW1, FW2, FW2V, FW18, FW200, 5150, 5160, 5170, Printex 35, U, V, 140U, Special Black 6, 5, 4A, and 4 (the above are manufactured by Degussa AG, trade name).

Examples of the yellow-based pigment include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta-based pigment include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, C.I. pigment violet 19, 23, 32, 33, 36, 38, 43, and 50.

Examples of the cyan-based pigment include C.I. pigment blue 1, 2, 3, 15, 15:1, 15:2, 15:3, 15:34, 15:4, 16, 18, 22, 25, 60, 65, and 66.

Examples of the pigment other than magenta, cyan, and yellow include C.I. pigment green 7, 10, C.I. pigment brown 3, 5, 25, 26, C.I. pigment orange 1, 2, 5, 7, 13, 14, 15, 16, 24, 34, 36, 38, 40, 43, and 63.

The aforementioned pigment may be used alone or two or more may be used in combination.

The content of the pigment included in the ink used in the embodiment is different depending on the type of the pigment to be used. The content of the pigment is preferably 1% by mass to 30% by mass, more preferably 1% by mass to 15% by mass, and still more preferably 5% by mass to 13% by mass with respect to the total mass of the ink, from a viewpoint of securing satisfactory color developing properties. Among these, in a case where titanium oxide is used as the pigment included in the ink, since titanium oxide is hardly precipitated and is excellent for exhibiting concealment and color reproductivity, in particular, on a cloth having low brightness, the content of titanium oxide is preferably 3% by mass to 25% by mass and more preferably 5% by mass to 20% by mass with respect to the total mass of the ink. Further, the content of titanium oxide is preferably 7% by mass to 15% by mass and more preferably 12% by mass or less.

The pigment may be a pigment which has been the surface treated or a pigment in which a dispersant is used, from a viewpoint of increasing dispersibility in the ink.

The pigment which has been surface treated refers to a pigment, in which a hydrophilic group such as a carboxyl group and a sulfonate group is directly or indirectly bonded to the pigment surface by physical treatment or chemical treatment so as to enable dispersion in an aqueous solvent (hereinafter, referred to as a "self-dispersion type pigment").

The pigment in which a dispersant is used refers to a pigment in which a pigment is dispersed by a surfactant or a resin (hereinafter, referred to as a "polymer-dispersion type pigment"), and any well-known material can be used as the surfactant or the resin. In addition, a pigment coated with a resin is included in the polymer-dispersion type pigment. The pigment coated with a resin can be obtained by an acid analysis method, inversion emulsification method, or miniemulsion polymerization method.

1.2.2. Resin

The ink used in the embodiment includes a resin. Since adhesion of the ink to a cloth is enhanced by including the resin, abrasion resistance of the image to be recorded can be enhanced.

The ink used in the embodiment can be appropriately used for recording of a cloth. Here, since the cloth has properties of being easily stretched, the image to be recorded, in other words, the ink film formed by the ink is preferably a film which is easily stretched (elongated). That is, since the ink film has elasticity in which the ink film can be stretched according to the stretching of the cloth, a fracture, cracking of the ink film can be prevented and washing•rubbing fastness can be secured. From this viewpoint, the film elasticity of the resin included in the ink according to the embodiment is preferably 400% to 1200%, more preferably 500% to 1200%, still more preferably 600% to 1200%, and particularly preferably 700% to 1200%. Since the film elasticity of the resin is within the aforementioned range, in particular, is not decreased below the lower limit, an image having excellent followability with respect to the stretching of the cloth can be formed. In addition, since the film elasticity of the resin is within the aforementioned range, in particular, does not exceed the upper limit, viscosity of the ink film can be maintained within the appropriate range and decrease of the anchor effect with respect to the cloth can be suppressed. Thus, it is possible to form an image having satisfactory washing•rubbing fastness (abrasion resistance), while the decrease in fixability is suppressed.

The film elasticity of the resin is measured as follows. First, the resin is applied to a polytetrafluoroethylene sheet such that the film thickness after drying is 500 µm, and the resin is dried at room temperature (20° C.)•normal pressure (65% RH) for 15 hours and further dried at a temperature of 80° C. for 6 hours and at a temperature of 120° C. for 20 minutes. After that, a resin film is created by peeling the resin off the sheet. Then, the film elasticity of the obtained resin film is measured by using a tensile strength tester under a condition of a measuring temperature of 20° C. and a measuring speed of 200 mm/min. The measurement of the film elasticity is performed such that the resin film is elongated until the resin film is fractured to measure the elongated length and a ratio thereof is shown in percentage as the film elasticity. In addition, as the tensile strength tester, for example, a universal testing instrument RTC-1225A (trade name, manufactured by ORIENTEC Co., LTD.) or an instrument same as this can be used.

In addition, a glass transition point (Tg) of the resin is preferably 0° C. or less and more preferably −10° C. or less from a viewpoint of preventing a fracture or cracking of the ink film and securing washing•rubbing fastness. Also, the lower limit of the glass transition point (Tg) is preferably −80° C. or more. In addition, a minimum film forming temperature (MFT) of the resin included in a first ink is preferably 0° C. or less and more preferably −10° C. or less from a viewpoint of preventing a fracture or cracking of the ink film and securing washing•rubbing fastness. Also, the lower limit of the minimum film forming temperature is preferably −80° C. or more.

The resin is preferably an emulsion from a viewpoint of enhancing abrasion resistance of the film, adhesion, and storage stability of the ink. The resin included in the ink according to the embodiment may be a self-emulsifying type in which a hydrophilic component necessary for stably dispersing the resin in water is introduced, or water-dispersible by the use of an emulsifier from outside. However, the resin is preferably a self-emulsifying type dispersant (self-emulsifying type emulsion) not including an emulsifier form a viewpoint of not inhibiting a reaction with a polyvalent metal compound included in the pretreatment agent described below.

As the resin, for example, an acrylic resin, a styrene acrylic resin, a fluorene-based resin, an urethane-based resin, a polyolefin-based resin, a rosin modified resin, a terpene-based resin, a polyester-based resin, a polyamide-based resin, an epoxy-based resin, a vinyl chloride-based resin, a vinyl chloride-vinyl acetate copolymer, and an ethylenevinyl acetate-based resin can be used. These resins may be used alone or two or more may be used in combination. Among these, at least one selected from the urethane-based resin and acrylic resin is preferable and the urethane-based resin is more preferably used, from a viewpoint of increasing freedom in designing so as to easily obtain desired film properties (aforementioned film elasticity).

The urethane-based resin is not particularly limited as long as the resin has a urethane structure and water dispersibility. For example, a commercially available product such as Super Flex 460, 460s, 840 (trade name, manufactured by DKS Co. Ltd.), Resamine D-1060, D-2020, D-4080, D-4200, D-6300, D-6455 (trade name, manufactured by Dainichiseika Color&Chemicals Mfg. Co., Ltd.), Takelac WS-6021, W-512-A-6 (trade name, manufactured by Mitsui Chemicals Polyurethanes, Inc.), and Sancure 2710 (trade name, manufactured by LUBRIZOL CORPORATION) may be used.

In addition, the urethane-based resin is preferably an anionic urethane-based resin having an anionic functional group such as a carboxy group, a sulfo group, and a hydroxy group, from a viewpoint of storage stability of the ink or enhancing reactivity with the polyvalent metal compound in a case where the polyvalent metal compound is included in the pretreatment agent described below. Among the aforementioned commercially available products, as the anionic urethane-based resin, Super Flex 460, 460s, and 840 manufactured by DKS Co. Ltd.; and Takelac WS-6021 and W-512-A-6 manufactured by Mitsui Chemicals Polyurethanes Inc. can be exemplified.

In addition, as the urethane-based resin, in addition to urethane bond, a polyether type urethane resin including ether bond on a main chain, a polyester type urethane resin including ester bond on a main chain, and a polycarbonate type urethane resin including carbonate bond on a main chain can be used. A plurality of these urethane resins may be combined to be used.

As the acrylic resin, a polymer of an acrylic monomer such as an acrylic acid and acrylic ester, and a copolymer of the acrylic monomer and other monomers can be used. Examples of the other monomers include a vinyl-based monomer such as styrene. As the acrylic resin, a commercially available product may be used, and Mowinyl 702, 7502, 7525, and 7320 (manufactured by The Nippon Synthetic Chemical Industry Co., Ltd.) can be exemplified.

The content of the resin is 10% by mass to 26% by mass, preferably 13% by mass to 23% by mass, and more preferably 17% by mass to 21% by mass with respect to the total mass of the ink in terms of a solid content. Since the content of the resin in the ink is within the aforementioned range, in particular, is not decreased below the lower limit, an effect in which the resin enhances fixability of the ink can be sufficiently exhibited. Thus, abrasion resistance of the image to be recorded is enhanced and washing fastness of the obtained ink coated film is enhanced. Also, since the content of the resin in the ink does not exceed the upper limit, generation of the aggregates caused by the resin can be suppressed. Thus, storage stability or discharge stability of the ink becomes excellent.

The ratio of the total content of the organic solvent to the total content of the solid content of the resin is 0.3 or more, preferably 0.4 to 3, and more preferably 0.5 to 2.7, and the upper limit is more preferably 2.5 or less and still more preferably 2 or less, from a viewpoint of securing washing fastness of the obtained ink coated film. Further, the upper limit is preferably 1.5 or less, more preferably 1.2 or less, and still more preferably 0.8 or less. Furthermore, a sum of the total content of the solid content of the resin and the total content of the organic solvent are 37% by mass or less, preferably 15% by mass to 35% by mass, and more preferably 18% by mass to 33% by mass with respect to the ink composition, from a viewpoint of securing washing fastness of the obtained ink coated film. Also, the lower limit is more preferably 22% by mass or more, still more preferably 27% by mass or more, and most preferably 30% by mass or more.

1.2.3. Aggregating Agent

In a case where an image is recorded on a non-white cloth, recording is performed by using a white ink including a white color-based pigment such as titanium oxide in order to render visibility of the image on the non-white cloth satisfactory. However, in the non-white cloth, there is a tendency that color developing properties of the ink in a case where the ink is filtrated into the cloth or concealment of the cloth are greatly decreased, and color developing properties of the image to be recorded and concealment of the cloth become insufficient. Thus, it is preferable to use a reaction liquid including an aggregating agent for aggregating or thickening the ink component, from a viewpoint of increasing color developing properties of the image obtained by the ink used for forming an image on the non-white cloth and increasing concealment of the cloth.

As the aggregating agent, for example, a polyvalent metal compound such as calcium chloride can be used. As the aggregating agent reacts with a component such as a resin or a pigment included in the ink to form aggregates by the component of the ink, it is possible to increase color developing properties of the image to be recorded and concealment of the cloth.

1.2.4. Other Components

The ink used in the embodiment may include water, an organic solvent, a surfactant, a pH adjuster, a preservative•fungicide, or the like.

Water

Water is a major medium of the ink and is a component which evaporates and scatters by drying. Examples of the water include pure water such as ion exchanged water, ultrafiltrated water, reverse osmotic water, and distilled water, and water from which ionic impurities are completely removed such as ultrapure water. Also, if water sterilized by irradiation with ultraviolet rays or addition of hydrogen peroxide is used, it is possible to prevent generation of fungi or bacteria in a case where the ink is stored for a long period of time. The content of water included in the ink is not particularly limited, and for example, the content of water may be 50% by mass or more and further may be 50% by mass to 95% by mass with respect to the total mass of the ink.

Organic Solvent

Examples of the organic solvent include 1,2-alkanediols, polyalcohols, and glycol ethers. These may be used alone or two or more may be used in combination. The content of the organic solvent is preferably 7% by mass to 27% by mass, more preferably 9% by mass to 25% by mass, still more preferably 10% by mass to 20% by mass, and particularly preferably 11% by mass to 15% by mass, with respect to the total mass of the ink.

Examples of the 1,2-alkanediols include 1,2-propanediol, 1,2-butanediol, 1,2-pentanediol, 1,2-hexanediol, and 1,2-octanediol. Since the 1,2-alkanediols has an excellent effect of causing the recording medium to wet uniformly by increasing wettability of the ink with respect to the recording medium such as a cloth, an image having less bleeding can be recorded. In a case where the 1,2-alkanediols are included, the content thereof may be 1% by mass to 20% by mass with respect to the total mass of the ink.

Examples of the polyalcohols include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, trimethylolpropane, and glycerin. The polyalcohols may be preferably used from a viewpoint of reducing clogging or discharge failure by suppressing the ink from drying and solidifying in the nozzle surface of the head. In a case where the polyalcohols are included, the content thereof may be 2% by mass to 20% by mass with respect to the total mass of the ink.

Examples of the glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethylmethyl ether, diethylene glycol dibutyl ether, triethylene glycol dimethyl ether, triethylene glycol diethyl ether, triethylene glycol dibutyl ether, triethylene glycol butylmethyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether.

Since the glycol ethers can control wettability of the ink with respect to the recording medium or a filtration rate, a clear image can be recorded. In a case where the glycol ethers are included, the content thereof may be 0.05% by mass to 6% by mass with respect to the total mass of the ink.

Surfactant

The surfactant has a function of increasing wettability with respect to the recording medium by decreasing the surface tension. Among the surfactant, for example, an acetylene glycol-based surfactant, a silicone-based surfactant, and a fluorine-based surfactant may be preferably used.

The acetylene glycol-based surfactant is not particularly limited, and the examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (trade name, all of the above are manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, AE-3 (trade name, all of the above are manufactured by Nissin Chemical Co., Ltd.), ACETYLENOL E00, E00P, E40, and E100 (trade name, all of the above are manufactured by Kawaken Fine Chemicals Co., Ltd.).

The silicone-based surfactant is not particularly limited, and a polysiloxane-based compound can be preferably exemplified. The polysiloxane-based compound is not particularly limited and examples thereof include polyether modified organosiloxanes. Examples of the commercially available products of polyether modified organosiloxanes include BYK-306, BYK-307, BYK-333, BYK-341, BYK-345, BYK-346, BYK-348 (trade name, all of the above are manufactured by BYK JAPAN K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, all of the above are manufactured by Shin-Etsu Chemical Co., Ltd.).

As the fluorine-based surfactant, a fluorine modified polymer is preferably used, and the specific example thereof is BYK-340 (manufactured by BYK Japan K.K.). pH adjuster Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Preservative•Fungicide

Examples of the preservative•fungicide include sodium benzoate, sodium pentachlorophenol, 2-pyridinethiol-1-oxide sodium, sodium sorbate, sodium dehydroacetate, and 1,2-dibenzine thiazoline-3-one (Proxel CRL, Proxel BND, Proxel GXL, Proxel XL-2, and Proxel TN of ICI).

1.2.5. Method for Manufacturing an Ink Composition

The ink used in the embodiment can be obtained by mixing the aforementioned components in an arbitrary order and removing impurities by means of filtration, if necessary. As a mixing method of each component, a method is appropriately used, in which the material is added to a container including a stirring apparatus such as a mechanical stirrer and a magnetic stirrer in an order to stir and mix the material. As a filtration method, centrifugal filtration or filter filtration can be performed, as necessary.

1.2.6. Physical Properties of Ink Composition

With regard to the surface tension of the ink used in the embodiment, the surface tension at a temperature of 20° C. is preferably 20 mN/m to 40 mN/m and more preferably 25 mN/m to 35 mN/m from a viewpoint of the balance between an image quality and reliability as the ink for ink jet. Also, the surface tension can be measured by confirming a surface tension when a platinum plate is wetted by the ink in an environment of 20° C., for example, using an automatic surface tensiometer CBVP-Z (trade name, manufactured by Kyowa Interface Science Co., Ltd).

In addition, from the same viewpoint, the viscosity of the ink according to the embodiment at a temperature of 20° C. is preferably 3 mPa·s to 10 mPa·s and more preferably 3 mPa·s to 8 mPa·s. Also, the viscosity can be measured in an environment of 20° C., for example, using viscoelastic testing machine MCR-300 (trade name, manufactured by Pysica).

Next, an ink attachment step and a reaction liquid attachment step in the ink jet printing method according to the embodiment will be described.

1.3. Ink Attachment Step

As described above, the ink attachment step according to the embodiment is a step for attaching the ink composition to the cloth, by using a nozzle discharging an ink composition; a pressure chamber for imparting pressure to the ink composition to cause the nozzle to discharge the ink composition; and a printer head, in which a distance of the connection portion is 500 µm or more, the distance of the connection portion being from a portion of the pressure chamber where the ink flows out from a pressure chamber to the nozzle side to the nozzle.

The cloth where the ink composition is attached is not particularly limited and examples thereof include natural fiber such as silk, cotton, and wool; a woven fabric, a knitted item; and a non-woven fabric using synthetic fiber including nylon, polyester, polypropylene and rayon as a raw material.

In an ink discharge step, the maximum mass per one ink droplet of the ink discharging is preferably 30 ng or less. Here, the ink amount of one discharged droplet is not the total number of ejections, but a mass discharged for one time (one ejection). In the ink attachment step according to the embodiment, since the maximum mass per one ink droplet of the ink discharging is 30 ng or less, the ink droplet becomes fine and strike through of the cloth can be suppressed. The maximum mass per one ink droplet is preferably 25 ng or less, more preferably 20 ng or less, still more preferably 15 ng or less, and most preferably 10 ng or less. The lower limit of the maximum mass per one ink droplet is preferably 1 ng or more, more preferably 3 ng or more, and still more preferably 5 ng or more.

In addition, in the ink attachment step, the maximum ink attachment amount to the cloth is preferably 100 mg/inch$^2$ or more. Since the ink attachment amount is 100 mg/inch$^2$ or more, it is possible to secure concealment of the image. The maximum ink attachment amount to the cloth is more preferably 150 mg/inch$^2$ or more and still more preferably 180 mg/inch$^2$ or more. In addition, the upper limit of the maximum ink attachment amount to the cloth is preferably 300 mg/inch$^2$ or less, more preferably 250 mg/inch$^2$ or more, and still more preferably 200 mg/inch$^2$ or more.

In addition, as described above, by using the printer head, in which a distance of the connection portion is 500 µm or more, the distance of the connection portion being from a portion of the pressure chamber where the ink flows out from a pressure chamber to the nozzle side to the nozzle, even in a case where the solid content of the resin is increased, the ink can be prevented from becoming dried from the nozzle surface and the ink jet printing method having excellent intermittency can be achieved. Also, the ink jet printed matter having excellent washing fastness can be obtained.

1.4. Reaction Liquid Attachment Step

The ink jet printing method according to the embodiment preferably includes a reaction liquid attachment step for attaching a reaction liquid which includes the aggregating agent for aggregating or thickening the component of the ink composition to the cloth before or after the ink attachment step. As described above, in a case where ink jet printing is performed on a non-white cloth using a white ink including a white color-based pigment, it is preferable to attach the reaction liquid which includes the aggregating agent for aggregating or thickening the ink component to the cloth, from a viewpoint of increasing color developing properties of the obtained image or concealment of the cloth.

For example, in a case where the reaction liquid attachment step is included before the ink attachment step, if the reaction liquid which includes the aggregating agent is attached to the area of the cloth where an image is formed by the ink being attached, the aggregating agent included in the reaction liquid and the resin or the pigment included in the ink react to each other when the ink is attached in the ink attachment step, and these components included in the ink may be aggregated as aggregates. Due to the above, color developing properties of the image formed in the ink attachment step are enhanced and the cloth can be concealed satisfactorily.

In addition, the reaction liquid attachment step can be included after the ink attachment step. In this case, by attaching the reaction liquid before the ink attached in the ink attachment step is dried, the resin or the pigment included in the ink may be aggregated as aggregates by the aggregating agent. Due to the above, color developing properties of the image formed in the ink attachment step are enhanced and the cloth can be concealed satisfactorily.

Hereinafter, some embodiments of the second invention will be described. The embodiments described below are describing one example of the invention. The invention is not limited to the following embodiments and includes various modifications which are executed within the range not departing the gist of the invention. In addition, the entirety of the configuration described below is not necessarily the essential configuration of the invention.

2. Ink Jet Printing Method

The ink jet printing method according to the embodiment of the invention includes attaching an ink composition to a cloth by using a printer head which has a nozzle discharging the ink composition, a pressure chamber for imparting pressure to the ink composition to cause the nozzle to discharge the ink composition, and a connection portion connecting the pressure chamber and the nozzle, and in which a distance of the connection portion is 500 µm or more, the distance of the connection portion being from a portion of the pressure chamber where the ink flows out from a pressure chamber to the nozzle side to the nozzle, in which the ink composition includes a resin and an organic solvent.

Hereinafter, a configuration of the apparatus which can execute the ink jet printing method according to the embodiment and an ink composition will be described in order. Then, a step of the ink jet printing method will be described in detail.

2.1. Apparatus Configuration

The ink jet printing apparatus according to the embodiment, as described above, includes a printer head which has a nozzle discharging an ink composition, a pressure chamber for imparting pressure to the ink composition to cause the nozzle to discharge the ink composition, and a connection portion connecting the pressure chamber and the nozzle, and in which a distance of the connection portion is 500 μm or more, the distance of the connection portion being from a portion of the pressure chamber where the ink flows out from a pressure chamber to the nozzle side to the nozzle.

Below, an on-carriage type printer to which an ink cartridge is installed to a carriage is exemplified as the ink jet printing apparatus according to the embodiment; however, the ink jet printing apparatus according to the invention is not limited to the on-carriage type printer and may be an off-carriage type printer in which the ink cartridge is fixed outside without being installed to the carriage.

In addition, the printer described below is a serial printer, in which a printer head is installed to the carriage moving in a predetermined direction and a liquid droplet is discharged on a recording medium as the head is moved by the movement of the carriage. The ink jet printing apparatus according to the invention is not limited to a serial printer, and may be a line printer, in which the head is formed larger than the width of the recording medium and the liquid droplet is discharged on the recording medium without the printer head being moved.

In respective drawings described below, a scale of various members is appropriately changed in order to obtain a size in which the various members can be recognized.

FIG. 1 is a perspective view schematically illustrating a printer 200, which is one example of the ink jet printing apparatus according to the embodiment. The printer 200 performs an ink jet printing on a cloth P as a recording medium.

As illustrated in FIG. 1, the printer 200 includes a printer head 100, a carriage 232 in which the printer head 100 is installed and an ink cartridge 231 is detachably mounted, a main scanning mechanism 235 which causes the carriage 232 to reciprocate in a medium width direction, and a platen roller 236 which transports a recording medium to a medium transportation direction. The printer 200 further includes a control portion (not illustrated) which controls the entire operations of the printer 200. Here, the medium width direction is a main scanning direction (head scanning direction), and the medium transportation direction is a sub-scanning direction (direction intersecting the main scanning direction).

The main scanning mechanism 235 includes a timing belt 238 connected to the carriage 232, a motor 239 driving the timing belt 238, and a guide shaft 240 provided in the main scanning direction, which is a support member. The carriage 232 is driven by the motor 239 via the timing belt 238, and reciprocates in the main scanning direction along the guide shaft 240. When the carriage reciprocates, an ink is discharged from the printer head 100 at a predetermined timing and printing is performed on the cloth P.

A belt unit 230 has an ink jet type recording head (hereinafter, simply referred to as a "head" or a "printer head") configured by the printer head 100 described below. The belt unit 230 further includes an ink cartridge 231 supplying an ink to the printer head 100 and a carriage 232 installed with the printer head 100 and the ink cartridge 231.

In the embodiment, an example, in which printing is performed while both the printer head 100 and the cloth P are moved, is shown. However, the printer 200 may be a mechanism in which printing is performed on the cloth P while positions of the printer head 100 and the cloth P are relatively changed to each other.

In addition, the exemplified printer 200 has one printer head 100, and printing is performed on the cloth P by this printer head 100. However, the printer may include a plurality of printer heads. In a case where the printer 200 includes a plurality of printer heads, each of the plurality of printer heads may be independently operated as described above and the plurality of printer heads are linked to each other to form one integrated head. As this integrated head, a line type head, in which each nozzle hole of the plurality of heads has an equivalent interval in entirety, can be exemplified.

2.1.1. Printer Head

FIG. 2 is an exploded perspective view schematically illustrating the printer head 100 in the printer 200 and shows the state where the upside of the printer head installed in the printer 200 illustrated in FIG. 1 is down. FIG. 3 is a cross-sectional view schematically illustrating main portions of the printer head 100 and schematically shows the flow of an ink from an ink supply chamber 40 to a nozzle hole 12 with dashed line arrows at the time of discharging operation of the ink.

A piezoelectric element 32 is simply illustrated in FIGS. 2 and 3. In addition, in the embodiment, the printer head 100 is configured to include a communicating plate 110 and a cover 150 but they are omitted in FIG. 2.

As illustrated in FIG. 2, the printer head 100 includes a nozzle plate 10 having a plurality of nozzle holes 12 on the surface facing the cloth P, which is a recording medium, a plurality of pressure chambers 20 respectively communicating with the plurality of nozzle holes 12 formed on the nozzle plate 10, a vibrating plate 30 for changing the capacity of each of the plurality of pressure chambers 20, an ink supply chamber 40 for supplying an ink to the plurality of pressure chambers 20, and a housing 130.

The nozzle plate 10 has the plurality of nozzle holes 12 for discharging an ink, these plurality of nozzle holes 12 are arranged in a row, and a nozzle surface 13 is formed on the surface of the nozzle plate 10. The number of nozzle hole 12 provided on the nozzle plate 10 is not particularly limited. In the printer head 100 used in the embodiment, the nozzle density in a row direction of the nozzle hole 12 is preferably 200 dpi or more. In other words, the interval between the nozzle hole 12 and the adjacent arranged nozzle hole 12 is preferably 127 μm or less. As the nozzle density is set to 200 dpi or more, the total ink ejection quantity can be maintained and the image concealment can be maintained, even in a case where the liquid droplet becomes minute. The nozzle density is more preferably 240 dpi or more and still more preferably 250 dpi or more, and more preferably 300 dpi or more, still more preferably 400 dpi or more, and most preferably 500 dpi or more. The upper limit of the nozzle density is preferably 2000 dpi or less and more preferably 1000 dpi or less.

Examples of the material of the nozzle plate 10 include silicon, stainless steel (SUS), and the like. In addition, if the material of the nozzle plate 10 is an alloy including iron (Fe) as a main component (50% or more) and chromium (Cr) in the amount of 10.5% or more, it is possible to obtain rigidity and prevent rust at the same time, which is more preferable. The thickness of the nozzle plate 10 is not particularly limited, and for example, the thickness thereof is preferably 50 μm or less, more preferably 20 μm or less, and still more preferably 1 μm to 10 μm.

The printer head 100 includes a pressure chamber substrate 120 for forming a pressure chamber 20 and examples of the material of the pressure chamber substrate 120 include silicon and the like. As illustrated in FIG. 3, the pressure chamber substrate 120 includes a communicating plate 110 as a channel forming substrate between the nozzle plate 10 and the pressure chamber substrate. As the communicating plate 110 divides a space between the nozzle plate 10 and the pressure chamber substrate 120, the ink supply chamber 40 (liquid storage portion), a supply port 126 communicating with the ink supply chamber 40, and the pressure chamber 20 communicating with the supply port 126 are formed. In other words, the ink supply chamber 40, the supply port 126 and the pressure chamber 20 are divided by the nozzle plate 10, the communicating plate 110, the pressure chamber substrate 120, and the vibrating plate 30.

The communicating plate 110 has a communicating hole 127 communicating with the nozzle hole 12 from the pressure chamber 20. A discharge port 128 of the ink is formed on the end portion of the communicating hole 127 formed on the surface where the communicating plate 110 is in contact with the nozzle plate 10. The discharge port 128 communicates with the nozzle hole 12 formed on the nozzle plate 10.

The vibrating plate 30 is provided to be in contact with the pressure chamber substrate 120 and the piezoelectric element 32 is formed to be in contact with the vibrating plate 30. The piezoelectric element 32 is electrically connected to a piezoelectric element driving circuit (not illustrated) and can be operated (vibrated or deformed) based on a signal of the piezoelectric element driving circuit. The vibrating plate 30 is deformed by the operation of the piezoelectric element 32 and internal pressure of the pressure chamber 20 can be changed by changing the capacity of the pressure chamber 20. The piezoelectric element 32 is not particularly limited and a type of the element (electromechanical transducer), which is deformed by the application of a voltage, can be exemplified. As such, in the embodiment, a piezoelectric actuator 34 is configured to include the piezoelectric element 32 and the vibrating plate 30.

In this example, the pressure chamber 20 is divided by the communicating plate 110, the pressure chamber substrate 120 and the vibrating plate 30, but the pressure chamber 20 can be formed by an appropriate member as long as the capacity can be changed by the vibration of the vibrating plate 30. Thus, the number, shape, and material of the member are optional. In addition, the vibrating plate 30 may be integral with an electrode (for example, formed of Pt, or the like) configuring the piezoelectric element 32.

Since the interval between the nozzle holes 12 is 127 μm or less, the printer head 100 of the embodiment preferably has a configuration of the piezoelectric element 32, in which a piezoelectric material is arranged between two electrodes. In other words, for example, one aspect of the piezoelectric actuator 34 is preferably a thin film, in which one electrode, a layer of the piezoelectric material (for example, lead zirconate titanate (PZT)), and the other electrode are laminated in order with respect to the vibrating plate 30, in entirety.

The material of the vibrating plate 30 is not particularly limited and examples thereof include silicon oxide ($SiO_2$), silicon nitride (SiN), silicon oxynitride (SiON), zirconium oxide ($ZrO_2$), titanium oxide ($TiO_2$), silicon carbide (SiC), and a laminate of the layer formed of these materials. The material of the vibrating plate 30 having a Young's modulus of 250 GPa or less is more preferable, from a viewpoint of being able to cause a great displacement and hardly cause damage. For example, the material is preferably formed by including $ZrO_2$ (150 GPa), $SiO_2$ (75 GPa), Si (130 GPa), SUS (199 GPa), and Cr (248 GPa) (the value inside the parenthesis is Young's modulus). In addition, in a case where the electrode of the piezoelectric element 32 is formed of Pt and laminated integrally with the vibrating plate 30, since the Young's modulus of Pt is 168 GPa and $ZrO_2$ is 150 GPa, even if they are combined, the total is 250 GPa or less. Thus, the above configuration may be allowed.

In the specification, Young's modulus indicates Young's modulus measured in a static test (JIS G0567J, or the like) (mechanical test), and for example, is measured by using a No. II-6 specimen.

Further, the printer head 100 includes a compliance sheet 140 as a member for forming a part of the ink channel and a cover 150 accommodating the piezoelectric element 32. A supply port 126 communicating with the ink supply chamber is formed between the compliance sheet 140 and the communicating plate 110. In addition, the compliance sheet 140 is a flexible and elastic film, and has a function as a damper for discharging or circulating an ink, and a function of suppressing damage of the printer head 100 by deformation, in a case where the volume of the ink is increased.

The compliance sheet 140 is not particularly limited as long as the sheet is a film having elasticity and for example, a polymer film, a thin metal film, a glass fiber, a carbon fiber, or the like are used. The material of the polymer film is not particularly limited and examples thereof include polyimide, nylon, polyolefin, and polyphenylene sulfite. It is preferable to form the compliance sheet by polyphenylene sulfite. In addition, examples of the metal include a material including iron or aluminium.

The thickness of the compliance sheet 140 is not particularly limited and for example, is preferably 50 μm or less, more preferably 20 μm or less, and still more preferably 1 μm to 10 μm. If the compliance sheet 140 is too thin, vibration at the time of discharging the ink becomes severe and a residual vibration may frequently occur.

In the embodiment, the ink supply chamber 40, the supply port 126, the pressure chamber 20 and the communicating hole 127 are described separately, but these are all liquid channels. As long as the pressure chamber 20 is formed, the channels may be designed in any way. For example, the supply port 126 has a shape in which a part of the channel is narrowed in the illustrated example, but the expansion and contraction of the channels can be optional according to the design, which are not entirely essential configuration.

The pressure chamber 20 formed by the aforementioned configuration is a space divided by the communicating plate 110, the pressure chamber substrate 120, and the vibrating plate 30, and refers to a space not including the supply port 126, the communicating hole 127, the discharge port 128, and the nozzle hole 12. That is, a space facing a portion for imparting pressure to the ink of the vibrating plate 30, the pressure chamber substrate 120, and the communicating plate 110, and a space (a portion where deformation or heat is generated in the wall of the pressure chamber 20), a space which is adjacent to this space and in which the cross-sectional area of the cross section facing the ink flowing direction is equal to that of this space is determined as the pressure chamber 20, and the capacity of the pressure chamber 20 is the capacity of this space. As the above, the pressure chamber 20 is a space of which the capacity is changed by displacement of the vibrating plate 30 and is defined as a space not including narrow channels or the like communicating with the space.

As described above, the pressure chamber 20 and the nozzle hole 12 are communicated with each other by the communicating hole 127. In the invention, a portion from the portion where the ink flows out from the pressure chamber to the nozzle side to the nozzle, in other words, in the example of FIG. 3, the communicating hole 127, the nozzle hole 12, and the entire portion connecting these are defined as a connection portion 132. Therefore, in the example of FIG. 3, since the connection portion 132 is provided so as to penetrate the communicating plate 110 in parallel in the thickness direction, the distance of the connection portion 132 is equal to the sum of the length d1 of the communicating plate 110 in the thickness direction and the length d2 of the nozzle plate 10 in the thickness direction.

In this embodiment, the sum of the length d1 of the communicating plate 110 in the thickness direction and the length d2 of the nozzle plate 10 in the thickness direction, in other words, d1+d2 is 500 μm or more. As such, since the connection portion 132 is configured to have the long distance, it is possible to prevent the ink from becoming dried from the nozzle surface 13. By doing this, even in a case where the content of the resin in the ink is increased in order to increase washing fastness of the ink coated film, intermittency is not impaired.

In the example of FIG. 3, the nozzle plate 10 and the communicating plate 110 are laminated and the nozzle hole 12 and the communicating hole 127 are formed of a different member; however, the nozzle plate and the communicating plate may be formed of a single member. Even in a case where the nozzle plate and the communicating plate are formed of a single member, the connection portion 132 refers to a portion from the portion where the ink flows out from the pressure chamber to the nozzle side to the nozzle. Even in this case, since the distance of the connection portion is 500 μm or more, it is possible to prevent the ink from becoming dried from the nozzle surface.

The distance of the connection portion 132 is preferably 500 μm to 3000 μm, more preferably 700 μm to 2500 μm, and still more preferably 900 μm to 1500 μm. Even in a case where the communicating hole is obliquely elongated with respect to the nozzle plate 10, the length of the communicating hole is the length along the communicating hole. In this case, the length of the communicating hole becomes longer than the length d1 of the communicating plate 110 in the thickness direction. That is, the shortest distance from a boundary between the pressure chamber 20 and the communicating hole to the nozzle hole 12 through the communicating hole is determined as the length of the communicating hole, and the distance of the connection portion is the distance in which the length of the nozzle hole 12 and the entire portion connecting these is added to the length of the communicating hole.

The total capacity of a pressure chamber per pressure chamber and the connection portion, in other words, in the embodiment, the total capacity of the pressure chamber 20, the communicating hole 127, and the nozzle hole 12 is preferably 4200 pl to 6200 pl and more preferably 4500 pl to 5500 pl. In this case, it is possible to prevent the ink from becoming dried from the nozzle surface 13.

In this case, the capacity per one pressure chamber 20 is preferably 3700 pl or less and more preferably 3500 pl or less. The capacity is still more preferably 3300 pl or less and particularly preferably 3000 pl or less. The lower limit of the capacity per one pressure chamber 20 is preferably 1500 pl or more and more preferably 2000 pl or more. Since the capacity of the pressure chamber 20 is 3700 pl or less, it is possible to secure the capacity of the communicating hole 127 sufficiently. Thus, it is possible to effectively prevent the ink from becoming dried from the nozzle surface 13.

The ink supply chamber 40 can temporarily store the ink supplied from outside (for example, an ink cartridge) via a through hole 129 provided in the vibrating plate 30. The ink in the ink supply chamber 40 can be supplied to the pressure chamber 20 via the supply port 126. The capacity of the pressure chamber 20 can be changed by deformation of the vibrating plate 30. The pressure chamber 20 communicates with the nozzle hole 12 via the communicating hole 127, and as the capacity of the pressure chamber 20 is changed, the ink is discharged from the nozzle hole 12 or the ink is introduced from the ink supply chamber 40 to the pressure chamber 20. Here, the nozzle size of the nozzle hole 12 is preferably 5 μm to 100 μm, more preferably 10 μm to 60 μm, and still more preferably 10 μm to 40 μm, from a viewpoint of obtaining excellent image quality, intermittency, or reducing the mist.

As illustrated in FIG. 2, the housing 130 can accommodate the nozzle plate 10, the pressure chamber substrate 120 and the piezoelectric element 32. As a material of the housing 130, a resin, a metal, or the like can be exemplified. The housing 130 may have a function to separate the piezoelectric element 32 from an outside environment. Also, an inert gas may be sealed in the housing 130 or pressure within the housing 130 may be reduced. By doing this, it is possible to suppress deterioration of the piezoelectric material.

The cover 150 is configured as a member separate from the housing 130. The cover 150 is provided so as to be in contact with the vibrating plate 30, forms a space for accommodating the piezoelectric element 32, and accommodates the piezoelectric element 32 in this space. A material of the cover 150 is the same as the aforementioned material of the housing 130. The aforementioned housing 130 is a cover covering the piezoelectric element 32, but the cover 150 has a function of separating the piezoelectric element 32 from the outside environment. An inert gas may be sealed in the space formed by the cover 150 or pressure of the space may be reduced. By doing this, it is possible to suppress deterioration of the piezoelectric material of the piezoelectric element 32. In this case, the housing 130 may have function as a support of the printer head 100.

In a case where the printer head 100 of the embodiment exemplified above is installed in the printer 200, the nozzle plate 10 is disposed toward the cloth P, so the nozzle plate 10 becomes in direct contact with the air (outside air). Also, since the printer head 100 of the embodiment has the housing 130 and the cover 150, the piezoelectric element 32 and the vibrating plate 30 are configured not to be in contact with the outside air substantially.

Here, the ink jet printing apparatus of the embodiment performs an ink jet printing method by using an ink composition described below.

2.2. Ink Composition

The ink composition used in the ink jet printing method according to the embodiment of the invention includes a resin and an organic solvent, the ink composition includes the resin as a solid content in the amount of 3% by mass to 13% by mass with respect to the ink composition, the ratio of the total content of the organic solvent to the total content of the solid content of the resin is 0.7 or more, and a sum of the total content of the solid content of the resin and the total content of the organic solvent is 35% by mass or less with respect to the ink composition.

Hereinafter, a component included in the ink composition (hereinafter, also simply referred to as an "ink") used for the ink jet printing method according to the embodiment will be described in detail.

2.2.1. Pigment

The ink used for the ink jet printing method according to the embodiment includes a pigment. As the pigment, either an organic pigment or an inorganic pigment can be used and a pigment in any color can be used.

For example, a white color-based pigment is not limited to the following and examples thereof include a white inorganic pigment such as titanium oxide, zinc oxide, zinc sulfide, antimony oxide, and zirconium oxide. A white organic pigment such as white hollow resin particles and polymer particles can be used, in addition to the white inorganic pigment.

A color index (C.I.) of the white color-based pigment is not limited to the following and examples thereof include C.I. pigment white 1 (basic lead carbonate), 4 (zinc oxide), 5 (a mixture of zinc sulfide and barium sulfate), 6 (titanium oxide), 6:1 (titanium oxide including other metal oxides), 7 (zinc sulfide), 18 (calcium carbonate), 19 (clay), (mica titanium), 21 (barium sulfate), 22 (natural barium sulfate), 23 (gloss white), 24 (alumina white), 25 (plaster), (magnesium oxide•silicon oxide), 27 (silica), and 28 (anhydrous calcium silicate). Among these, titanium oxide is preferable since color developing properties, concealment, and visibility (brightness) are excellent and a satisfactory dispersed particle diameter is obtained.

Among the aforementioned titanium oxide, a general rutile type titanium oxide is preferable as the white color-based pigment. This rutile type titanium oxide may be manufactured by oneself or may be the one commercially available. As an industrial manufacturing method in a case where the rutile type titanium oxide (powder form) is manufactured by oneself, the well-known sulfuric acid method and a chlorine method can be exemplified. Examples of the rutile type titanium oxide include rutile types such as Tipaque (registered trade mark) CR-60-2, CR-67, R-980, R-780, R-850, R-980, R-630, R-670, and PF-736 (the above are manufacture by ISHIHARA SANGYO KAISHA, LTD., trade name).

The ink used in the embodiment may include a pigment other than the white color-based pigment. The pigment other than the white color-based pigment refers to a pigment excluding the aforementioned white color-based pigment. The pigment other than the white color-based pigment is not particularly limited below and for example, an organic pigment such as an azo-based pigment, a phthalocyanine-based pigment, a dye-based pigment, a condensed polycyclic pigment, a nitro-based pigment, and a nitroso-based pigment (brilliant carmine 6B, lake red C, watching red, disazo yellow, hansa yellow, phthalocyanine blue, phthalocyanine green, alkali blue, and aniline black); metals such as cobalt, iron, chromium, copper, zinc, lead, titanium, vanadium, manganese, and nickel, and metal oxides and sulfides; carbon blacks (C.I. pigment black 7) such as furnace carbon black, lamp black, acetylene black, and channel black; and an inorganic pigment such as yellow soil, ultramarine blue, and iron blue can be used.

Further specifically, examples of the carbon black which can be used as a black-based pigment include MCF88, No. 2300, 2200B, 900, 33, 40, 45, 52, MA7, 8, 100 (the above are manufactured by Mitsubishi Chemical Corporation, trade name), Raven 5750, 5250, 5000, 3500, 1255, 700 (the above are manufactured by Columbia Carbon Co., Ltd., trade name), Regal 400R, 330R, 660R, Mogul L, Monarch 700, 800, 880, 900, 1000, 1100, 1300, 1400 (the above are manufactured by Cabot Corporation, trade name), Color Black FW1, FW2, FW2V, FW18, FW200, 5150, 5160, 5170, Printex 35, U, V, 140U, Special Black 6, 5, 4A, and 4 (the above are manufactured by Degussa AG, trade name).

Examples of the yellow-based pigment include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta-based pigment include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, C.I. pigment violet 19, 23, 32, 33, 36, 38, 43, and 50.

Examples of the cyan-based pigment include C.I. pigment blue 1, 2, 3, 15, 15:1, 15:2, 15:3, 15:34, 15:4, 16, 18, 22, 25, 60, 65, and 66.

Examples of the pigment other than magenta, cyan, and yellow include C.I. pigment green 7, 10, C.I. pigment brown 3, 5, 25, 26, C.I. pigment orange 1, 2, 5, 7, 13, 14, 15, 16, 24, 34, 36, 38, 40, 43, and 63.

The aforementioned pigment may be used alone or two or more may be used in combination.

The content of the pigment included in the ink used in the embodiment is different depending on the type of the pigment to be used. The content of the pigment is preferably 1% by mass to 30% by mass, more preferably 1% by mass to 15% by mass, and still more preferably 5% by mass to 13% by mass with respect to the total mass of the ink, from a viewpoint of securing satisfactory color developing properties. Among these, in a case where a non-white pigment for a color ink is used as the pigment included in the ink, the content of the non-white pigment is preferably 0.2% by mass to 8% by mass, more preferably 1% by mass to 6% by mass, and still more preferably 2% by mass to 5% by mass with respect to the total mass of the ink.

The pigment may be a pigment which has been the surface treated or a pigment in which a dispersant is used, from a viewpoint of increasing dispersibility in the ink.

The pigment which has been surface treated refers to a pigment, in which a hydrophilic group such as a carboxyl group and a sulfonate group is directly or indirectly bonded to the pigment surface by physical treatment or chemical treatment so as to enable dispersion in an aqueous solvent (hereinafter, referred to as a "self-dispersion type pigment").

The pigment in which a dispersant is used refers to a pigment in which a pigment is dispersed by a surfactant or a resin (hereinafter, referred to as a "polymer-dispersion type pigment"), and any well-known material can be used as the surfactant or the resin. In addition, a pigment coated with a resin is included in the polymer-dispersion type pigment. The pigment coated with a resin can be obtained by an acid analysis method, inversion emulsification method, or mini-emulsion polymerization method.

2.2.2. Resin

The ink used in the embodiment includes a resin. Since adhesion of the ink to a cloth is enhanced by including the resin, abrasion resistance of the image to be recorded can be enhanced.

The ink used in the embodiment can be appropriately used for recording of a cloth. Here, since the cloth has properties of being easily stretched, the image to be recorded, in other words, the ink film formed by the ink is preferably a film which is easily stretched (elongated). That is, since the ink film has elasticity in which the ink film can be stretched according to the stretching of the cloth, a fracture, cracking of the ink film can be prevented and washing•rubbing fastness can be secured. From this viewpoint, the film elasticity of the resin included in the ink according to the embodiment is preferably 400% to 1200%, more preferably 500% to 1200%, still more preferably 600% to 1200%, and particularly preferably 700% to 1200%. Since the film elasticity of the resin is within the aforementioned range, in particular, is not decreased below the lower limit, an image having excellent followability with respect to the stretching of the cloth can be formed. In addition, since the film elasticity of the resin is within the aforementioned range, in particular, does not exceed the upper limit, viscosity of the ink film can be maintained within the appropriate range and decrease of the anchor effect with respect to the cloth can be suppressed. Thus, it is possible to form an image having satisfactory washing•rubbing fastness (abrasion resistance), while the decrease in fixability is suppressed.

The film elasticity of the resin is measured as follows. First, the resin is applied to a polytetrafluoroethylene sheet such that the film thickness after drying is 500 μm, and the resin is dried at room temperature (20° C.)•normal pressure (65% RH) for 15 hours and further dried at a temperature of 80° C. for 6 hours and at a temperature of 120° C. for 20 minutes. After that, a resin film is created by peeling the resin off the sheet. Then, the film elasticity of the obtained resin film is measured by using a tensile strength tester under a condition of a measuring temperature of 20° C. and a measuring speed of 200 mm/min. The measurement of the film elasticity is performed such that the resin film is elongated until the resin film is fractured to measure the elongated length and a ratio thereof is shown in percentage as the film elasticity. In addition, as the tensile strength tester, for example, a universal testing instrument RTC-1225A (trade name, manufactured by ORIENTEC Co., LTD.) or an instrument same as this can be used.

In addition, a glass transition point (Tg) of the resin is preferably 0° C. or less and more preferably −10° C. or less from a viewpoint of preventing a fracture or cracking of the ink film and securing washing•rubbing fastness. Also, the lower limit of the glass transition point (Tg) is preferably −80° C. or more. In addition, a minimum film forming temperature (MFT) of the resin included in a first ink is preferably 0° C. or less and more preferably −10° C. or less from a viewpoint of preventing a fracture or cracking of the ink film and securing washing•rubbing fastness. Also, the lower limit of the minimum film forming temperature is preferably −80° C. or more.

The resin is preferably an emulsion from a viewpoint of enhancing abrasion resistance of the film, adhesion, and storage stability of the ink. The resin included in the ink according to the embodiment may be a self-emulsifying type in which a hydrophilic component necessary for stably dispersing the resin in water is introduced, or water-dispersible by the use of an emulsifier from outside. However, the resin is preferably a self-emulsifying type dispersant (self-emulsifying type emulsion) not including an emulsifier form a viewpoint of not inhibiting a reaction with a polyvalent metal compound included in the pretreatment agent described below.

As the resin, for example, an acrylic resin, a styrene acrylic resin, a fluorene-based resin, an urethane-based resin, a polyolefin-based resin, a rosin modified resin, a terpene-based resin, a polyester-based resin, a polyamide-based resin, an epoxy-based resin, a vinyl chloride-based resin, a vinyl chloride-vinyl acetate copolymer, and an ethylenevinyl acetate-based resin can be used. These resins may be used alone or two or more may be used in combination. Among these, at least one selected from the urethane-based resin and acrylic resin is preferable and the urethane-based resin is more preferably used, from a viewpoint of increasing freedom in designing so as to easily obtain desired film properties (aforementioned film elasticity).

The urethane-based resin is not particularly limited as long as the resin has an urethane structure and water dispersibility. For example, a commercially available product such as Super Flex 460, 460s, 840 (trade name, manufactured by DKS Co. Ltd.), Resamine D-1060, D-2020, D-4080, D-4200, D-6300, D-6455 (trade name, manufactured by Dainichiseika Color&Chemicals Mfg. Co., Ltd.), Takelac WS-6021, W-512-A-6 (trade name, manufactured by Mitsui Chemicals Polyurethanes, Inc.), and Sancure 2710 (trade name, manufactured by LUBRIZOL CORPORATION) may be used.

In addition, the urethane-based resin is preferably an anionic urethane-based resin having an anionic functional group such as a carboxy group, a sulfo group, and a hydroxy group, from a viewpoint of storage stability of the ink or enhancing reactivity with the polyvalent metal compound in a case where the polyvalent metal compound is included in the pretreatment agent described below. Among the aforementioned commercially available products, as the anionic urethane-based resin, Super Flex 460, 460s, and 840 manufactured by DKS Co. Ltd.; and Takelac WS-6021 and W-512-A-6 manufactured by Mitsui Chemicals Polyurethanes Inc. can be exemplified.

In addition, as the urethane-based resin, in addition to urethane bond, a polyether type urethane resin including ether bond on a main chain, a polyester type urethane resin including ester bond on a main chain, and a polycarbonate type urethane resin including carbonate bond on a main chain can be used. A plurality of these urethane resins may be combined to be used.

As the acrylic resin, a polymer of an acrylic monomer such as an acrylic acid and acrylic ester, and a copolymer of the acrylic monomer and other monomers can be used. Examples of the other monomers include a vinyl-based monomer such as styrene. As the acrylic resin, a commercially available product may be used, and Mowinyl 702, 7502, 7525, and 7320 (manufactured by The Nippon Synthetic Chemical Industry Co., Ltd.) can be exemplified.

The content of the resin is preferably 1% by mass to 15% by mass, more preferably 2% by mass to 14% by mass, and still more preferably 3% by mass to 13% by mass, still more preferably 5% by mass to 12% by mass, still more preferably 7% by mass to 11% by mass, and most preferably 8% by mass to 10% by mass with respect to the total mass of the ink in terms of a solid content. Since the content of the resin in the ink is within the aforementioned range, in particular, is not decreased below the lower limit, an effect in which the resin enhances fixability of the ink can be sufficiently exhibited. Thus, abrasion resistance of the image to be recorded is enhanced and washing fastness of the obtained ink coated film is enhanced. Also, since the content of the resin in the ink does not exceed the upper limit, generation of the aggregates caused by the resin can be suppressed. Thus, storage stability or discharge stability of the ink becomes excellent.

The ratio of the total content of the organic solvent to the total content of the solid content of the resin is preferably 0.5 or more, more preferably 0.7 or more, still more preferably 0.8 to 8.5, still more preferably 1 to 6, particularly preferably 1.5 to 5, and most preferably 1.7 to 3. Further, the sum of the total content of the organic solvent and the total content of the solid content of the resin is preferably 40% by mass or less, more preferably 35% by mass or less, and still more preferably 33% by mass or less with respect to the ink composition, from a viewpoint of securing washing fastness of the obtained ink coated film. Also, the lower limit is preferably 15% by mass or more, more preferably 20% by mass or more, still more preferably 25% by mass or more, particularly preferably 27% by mass or more, and most preferably 29% by mass or more.

2.2.3. Aggregating Agent

In a case where an image is recorded on a non-white cloth, recording is performed by using a white ink including a white color-based pigment such as titanium oxide in order to render visibility of the image on the non-white cloth satisfactory. However, in the non-white cloth, there is a tendency that color developing properties of the ink in a case where the ink is filtrated into the cloth or concealment of the cloth are greatly decreased, and color developing properties of the image to be recorded and concealment of the cloth become insufficient. Thus, it is preferable to use a reaction liquid including an aggregating agent for aggregating or thickening the ink component, from a viewpoint of increasing color developing properties of the image obtained by the ink used for forming an image on the non-white cloth and increasing concealment of the cloth.

As the aggregating agent, for example, a polyvalent metal compound such as calcium chloride can be used. As the aggregating agent reacts with a component such as a resin or a pigment included in the ink to form aggregates by the component of the ink, it is possible to increase color developing properties of the image to be recorded and concealment of the cloth.

2.2.4. Other Components

The ink used in the embodiment may include water, an organic solvent, a surfactant, a pH adjuster, a preservative•fungicide, or the like.

Water

Water is a major medium of the ink and is a component which evaporates and scatters by drying. Examples of the water include pure water such as ion exchanged water, ultrafiltrated water, reverse osmotic water, and distilled water, and water from which ionic impurities are completely removed such as ultrapure water. Also, if water sterilized by irradiation with ultraviolet rays or addition of hydrogen peroxide is used, it is possible to prevent generation of fungi or bacteria in a case where the ink is stored for a long period of time. The content of water included in the ink is not particularly limited, and for example, the content of water may be 50% by mass or more and further may be 50% by mass to 95% by mass with respect to the total mass of the ink.

Organic Solvent

Examples of the organic solvent include 1,2-alkanediols, polyalcohols, and glycol ethers. These may be used alone or two or more may be used in combination. The content of the organic solvent is preferably 8% by mass to 30% by mass, more preferably 10% by mass to 25% by mass, still more preferably 15% by mass to 23% by mass, and particularly preferably 18% by mass to 23% by mass, with respect to the total mass of the ink.

Examples of the 1,2-alkanediols include 1,2-propanediol, 1,2-butanediol, 1,2-pentanediol, 1,2-hexanediol, and 1,2-octanediol. Since the 1,2-alkanediols has an excellent effect of causing the recording medium to wet uniformly by increasing wettability of the ink with respect to the recording medium such as a cloth, an image having less bleeding can be recorded. In a case where the 1,2-alkanediols are included, the content thereof may be 1% by mass to 20% by mass with respect to the total mass of the ink.

Examples of the polyalcohols include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, trimethylolpropane, and glycerin. The polyalcohols may be preferably used from a viewpoint of reducing clogging or discharge failure by suppressing the ink from drying and solidifying in the nozzle surface of the head. In a case where the polyalcohols are included, the content thereof may be 2% by mass to 20% by mass with respect to the total mass of the ink.

Examples of the glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethylmethyl ether, diethylene glycol dibutyl ether, triethylene glycol dimethyl ether, triethylene glycol diethyl ether, triethylene glycol dibutyl ether, triethylene glycol butylmethyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether.

Since the glycol ethers can control wettability of the ink with respect to the recording medium or a filtration rate, a clear image can be recorded. In a case where the glycol ethers are included, the content thereof may be 0.05% by mass to 6% by mass with respect to the total mass of the ink.

Surfactant

The surfactant has a function of increasing wettability with respect to the recording medium by decreasing the surface tension. Among the surfactant, for example, an acetylene glycol-based surfactant, a silicone-based surfactant, and a fluorine-based surfactant may be preferably used.

The acetylene glycol-based surfactant is not particularly limited, and the examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (trade name, all of the above are manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, AE-3 (trade name, all of the above are manufactured by Nissin Chemical Co., Ltd.), ACETYLENOL E00, E00P, E40, and E100 (trade name, all of the above are manufactured by Kawaken Fine Chemicals Co., Ltd.).

The silicone-based surfactant is not particularly limited, and a polysiloxane-based compound can be preferably exemplified. The polysiloxane-based compound is not particularly limited and examples thereof include polyether modified organosiloxanes. Examples of the commercially available products of polyether modified organosiloxanes include BYK-306, BYK-307, BYK-333, BYK-341, BYK-345, BYK-346, BYK-348 (trade name, all of the above are manufactured by BYK JAPAN K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, all of the above are manufactured by Shin-Etsu Chemical Co., Ltd.).

As the fluorine-based surfactant, a fluorine modified polymer is preferably used, and the specific example thereof is BYK-340 (manufactured by BYK Japan K.K.). pH adjuster Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Preservative•Fungicide

Examples of the preservative•fungicide include sodium benzoate, sodium pentachlorophenol, 2-pyridinethiol-1-oxide sodium, sodium sorbate, sodium dehydroacetate, and 1,2-dibenzine thiazoline-3-one (Proxel CRL, Proxel BND, Proxel GXL, Proxel XL-2, and Proxel TN of ICI).

2.2.5. Method for Manufacturing an Ink Composition

The ink used in the embodiment can be obtained by mixing the aforementioned components in an arbitrary order and removing impurities by means of filtration, if necessary. As a mixing method of each component, a method is appropriately used, in which the material is added to a container including a stirring apparatus such as a mechanical stirrer and a magnetic stirrer in an order to stir and mix the material. As a filtration method, centrifugal filtration or filter filtration can be performed, as necessary.

2.2.6. Physical Properties of Ink Composition

With regard to the surface tension of the ink used in the embodiment, the surface tension at a temperature of 20° C. is preferably 20 mN/m to 40 mN/m and more preferably 25 mN/m to 35 mN/m from a viewpoint of the balance between an image quality and reliability as the ink for ink jet. Also, the surface tension can be measured by confirming a surface tension when a platinum plate is wetted by the ink in an environment of 20° C., for example, using an automatic surface tensiometer CBVP-Z (trade name, manufactured by Kyowa Interface Science Co., Ltd).

In addition, from the same viewpoint, the viscosity of the ink according to the embodiment at a temperature of 20° C. is preferably 3 mPa·s to 10 mPa·s and more preferably 3 mPa·s to 8 mPa·s. Also, the viscosity can be measured in an environment of 20° C., for example, using viscoelastic testing machine MCR-300 (trade name, manufactured by Pysica).

Next, an ink attachment step and a reaction liquid attachment step in the ink jet printing method according to the embodiment will be described.

2.3. Ink Attachment Step

As described above, the ink attachment step according to the embodiment is a step for attaching the ink composition to the cloth, by using a nozzle discharging an ink composition; a pressure chamber for imparting pressure to the ink composition to cause the nozzle to discharge the ink composition; and a printer head, in which a distance of the connection portion is 500 μm or more, the distance of the connection portion being from a portion of the pressure chamber where the ink flows out from a pressure chamber to the nozzle side to the nozzle.

The cloth where the ink composition is attached is not particularly limited and examples thereof include natural fiber such as silk, cotton, and wool; a woven fabric, a knitted item; and a non-woven fabric using synthetic fiber including nylon, polyester, polypropylene and rayon as a raw material.

In an ink discharge step, the maximum mass per one ink droplet of the ink discharging is preferably 30 ng or less. Here, the ink amount of one discharged droplet is not the total number of ejections, but a mass discharged for one time (one ejection). In the ink attachment step according to the embodiment, since the maximum mass per one ink droplet of the ink discharging is 30 ng or less, the ink droplet becomes fine and strike through of the cloth can be suppressed. The maximum mass per one ink droplet is preferably 25 ng or less, more preferably 20 ng or less, still more preferably 15 ng or less, and most preferably 10 ng or less. The lower limit of the maximum mass per one ink droplet is preferably 1 ng or more, more preferably 3 ng or more, and still more preferably 5 ng or more.

In addition, in the ink attachment step, the maximum ink attachment amount to the cloth is preferably 40 mg/inch$^2$ or less. Since the maximum ink attachment amount to the cloth is 40 mg/inch$^2$ or less, it is possible to suppress strike through of the cloth. The maximum ink attachment amount to the cloth is more preferably 30 mg/inch$^2$ or less, still more preferably 20 mg/inch$^2$ or less, particularly preferably 15 mg/inch$^2$ or less, and most preferably 10 mg/inch$^2$ or less. In addition, the lower limit of the maximum ink attachment amount to the cloth is preferably 1 mg/inch$^2$ or more and more preferably 5 mg/inch$^2$ or more.

In addition, as described above, by using the printer head, in which a distance of the connection portion is 500 μm or more, the distance of the connection portion being from a portion of the pressure chamber where the ink flows out from a pressure chamber to the nozzle side to the nozzle, even in a case where the solid content of the resin is increased, the ink can be prevented from becoming dried from the nozzle surface and the ink jet printing method having excellent intermittency can be achieved. Also, the ink jet printed matter having excellent washing fastness can be obtained.

2.4. Reaction Liquid Attachment Step

The ink jet printing method according to the embodiment preferably includes a reaction liquid attachment step for attaching a reaction liquid which includes the aggregating agent for aggregating or thickening the component of the ink composition to the cloth before or after the ink attachment step. As described above, in a case where ink jet printing is performed on a non-white cloth, for example, using a white ink including a white color-based pigment, it is preferable to attach the reaction liquid which includes the aggregating agent for aggregating or thickening the ink component to the cloth, from a viewpoint of increasing color developing properties of the obtained image or concealment of the cloth.

For example, in a case where the reaction liquid attachment step is included before the ink attachment step, if the reaction liquid which includes the aggregating agent is attached to the area of the cloth where an image is formed by the ink being attached, the aggregating agent included in the reaction liquid and the resin or the pigment included in the ink react to each other when the ink is attached in the ink attachment step, and these components included in the ink may be aggregated as aggregates. Due to the above, color developing properties of the image formed in the ink attachment step are enhanced and the cloth can be concealed satisfactorily.

In addition, the reaction liquid attachment step can be included after the ink attachment step. In this case, by attaching the reaction liquid before the ink attached in the ink attachment step is dried, the resin or the pigment included in the ink may be aggregated as aggregates by the aggregating agent. Due to the above, color developing properties of the image formed in the ink attachment step are enhanced and the cloth can be concealed satisfactorily.

3. Examples

Hereinafter, the first invention will be described in more detail using Examples and Comparative Examples and the invention is not limited to these Examples. In addition, "parts" and "%" in Examples and Comparative Examples is on the basis of mass unless otherwise mentioned.

3.1. Preparation of White Ink Composition

After the components shown in the lower column of Table 1 were mixed to each other and stirred for 2 hours by a magnetic stirrer, they were filtrated using a membrane filter having a pore diameter of 5 μm to obtain a white ink composition of I1 to I9. In addition, the numerical values in Table 1 represent the content of the white ink composition (based on mass %), and the upper column of Table 1 represents respective numerical values corresponding to Claim 1. Also, abbreviated names of respective components shown in Table 1 are as follows.

White pigment (trade name "Tipaque (registered trade mark) CR-60-2", manufactured by ISHIHARA SANGYO KAISHA, LTD.)

Urethane resin (trade name "Takelac WS-6021", manufactured by Mitsui Chemicals, Inc.)

Surfactant (trade name "BYK-306", manufactured by BYK Japan K.K.)

Additive (trade name "Proxel CRL", manufactured by ICI)

TABLE 1

|  | Ink No. | | | | | | | | |
| --- | --- | --- | --- | --- | --- | --- | --- | --- | --- |
|  | I1 | I2 | I3 | I4 | I5 | I6 | I7 | I8 | I9 |
| Solid content of resin | 19 | 10 | 10 | 25 | 25 | 8 | 27 | 25 | 11 |
| Total amount of organic solvent | 12 | 27 | 10 | 8 | 12 | 14 | 11 | 6 | 28 |
| Total amount of organic solvent/total amount of solid content of resin | 0.63 | 2.70 | 1.00 | 0.32 | 0.48 | 1.75 | 0.41 | 0.24 | 2.55 |
| Total amount of solid content of resin + total amount of organic solvent | 31.0 | 37.0 | 20.0 | 33.0 | 37.0 | 22.0 | 38.0 | 31.0 | 39.0 |
| Solid content of white pigment | 10 | 10 | 10 | 10 | 10 | 10 | 10 | 10 | 10 |
| Solid content of urethane resin | 19 | 10 | 10 | 25 | 25 | 8 | 27 | 25 | 11 |
| Glycerin | 6 | 13 | 5 | 5 | 6 | 7 | 5 | 3 | 14 |
| Triethylene glycol | 2 | 6 | 2 | 1 | 2 | 3 | 2 | 1 | 6 |
| Propylene glycol | 2 | 6 | 2 | 1 | 2 | 2 | 2 | 1 | 6 |
| Triethylene glycol monobutyl ether | 2 | 2 | 1 | 1 | 2 | 2 | 2 | 1 | 2 |
| Surfactant | 0.3 | 0.3 | 0.3 | 0.3 | 0.3 | 0.3 | 0.3 | 0.3 | 0.3 |
| Various additives | 0.3 | 0.3 | 0.3 | 0.3 | 0.3 | 0.3 | 0.3 | 0.3 | 0.3 |
| Water | 58.4 | 52.4 | 69.4 | 56.4 | 52.4 | 67.4 | 51.4 | 58.4 | 50.4 |
| Total | 100 | 100 | 100 | 100 | 100 | 100 | 100 | 100 | 100 |

3.2. Preparation of Ink Jet Printing Apparatus

As the ink jet printing apparatus including the printer head illustrated in FIGS. 1 to 3 described above, a modified device of SC-F2000 (manufactured by Seiko Epson Corp.) was prepared. Three types of the heads H1 to H3 shown in Table 2 were used as the head.

TABLE 2

|  | Printer head No. | | | |
| --- | --- | --- | --- | --- |
|  | H1 | H2 | H3 | H4 |
| Length from pressure chamber to nozzle surface [μm] | 1000 | 100 | 1000 | 500 |
| Nozzle pitch [dpi] | 300 | 360 | 180 | 300 |
| Capacity of pressure chamber [pl] | 2900 | 2900 | 3700 | 2900 |
| Total capacity of nozzle hole, communicating hole, and pressure chamber | 4200 | 3100 | 5000 | 3600 |

Here, the head H1 has a structure shown in FIG. 3 and the length from the bottom surface of the pressure chamber 20 to the nozzle surface 13, in other words, the distance of the connection portion 132 (d1+d2) is 1000 μm, the nozzle pitch is 300 dpi, the capacity of the pressure chamber 20 is 2900 pl, and the sum of the capacity of the communicating hole 127, the nozzle hole 12, and the pressure chamber 20 is 4200 pl.

Figure 4:
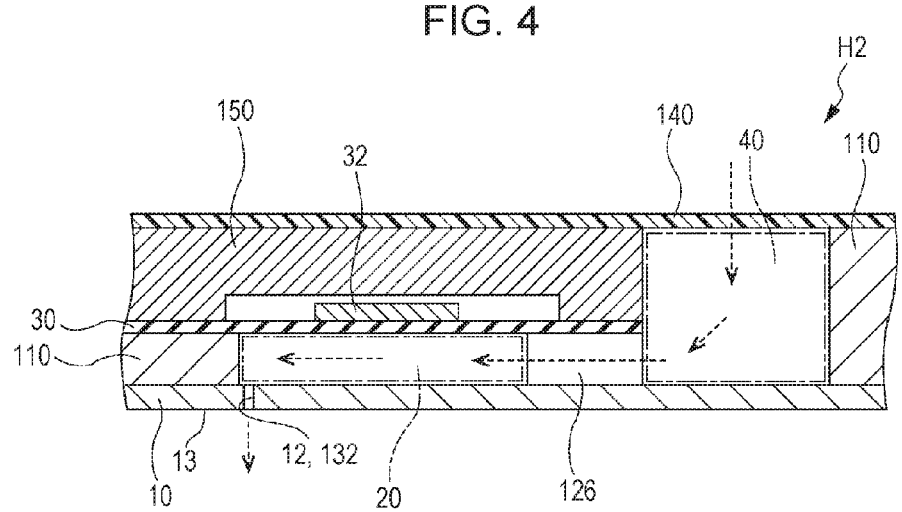
FIG. 4 is a cross-sectional view schematically illustrating the main portions of the head used in Comparative Examples.

The head H2 has a structure shown in FIG. 4. That is, the printer head H2 shown in FIG. 4 does not include a communicating hole, and the pressure chamber 20 indicates a space divided by the nozzle plate 10, the communicating plate 110, and the vibrating plate 30, which is a space not including the nozzle hole 12 and the supply port 126. In the head H2, the length from the bottom surface of the pressure chamber 20 to the length of the nozzle surface 13, in other words, the distance of the connection portion 132 is the length of the nozzle hole 12, which is 100 μm, the same as the thickness of the nozzle plate 10. Also, the nozzle pitch is 360 dpi, the capacity of the pressure chamber 20 is 2900 pl, and the sum of the capacity of the nozzle hole 12 and the pressure chamber 20 is 3100 pl.

The head H3 is a head having a similar structure to the head H1, the capacity of the pressure chamber is greater, and the nozzle density is lower than that of the head H1. That is, the distance of the connection portion 132 is 1000 μm, the nozzle pitch is 180 dpi, the capacity of the pressure chamber 20 is 3700 pl, and the sum of the capacity of the communicating hole 127, the nozzle hole 12, and the pressure chamber 20 is 5000 pl.

The head H4 is a head having a similar structure to the head H1, the distance of the connection portion 132 is 500 μm, shorter than that of the head H1, and the capacity of the nozzle pitch and the pressure chamber 20 is the same as that of the head H1. That is, the nozzle pitch is 300 dpi, the capacity of the pressure chamber 20 is 2900 pl, and the sum of the capacity of the communicating hole 127, the nozzle hole 12 and the pressure chamber 20 is 3600 pl since the distance of the connection portion 132 is shorter than that of the head H1. In addition, in all of the heads, the nozzle size of the nozzle hole 12 is 20 μm.

3.3. Printing Recording Test

A printing recording test was performed on a cloth (manufactured by Hanesbrands Inc., heavy weight, cotton 100%, black texture). 15% by mass of calcium chloride, 0.1% by mass of a surfactant (trade name "BYK-348", manufactured by BYK Japan K.K.), 10% by mass of Mowinyl 966A (trade name, manufactured by the Nippon Synthetic Chemical Industry Co., Ltd.), and ion exchanged water (residues) were mixed to each other such that the total amount becomes 100% by mass to obtain a pretreatment agent. Here, the mixing amount of respective components is based on a solid content.

After the pretreatment liquid was sprayed uniformly on A4 size cloth in a coating amount of 3 g and heated to be dried, the cloth was set into the aforementioned printer, one nozzle row of each head was filled with the prepared inks I1 to I9, the ink was discharged from the head to attach the ink to the cloth. The mass of the ink per one droplet was set as the values shown in Tables 3, and the ink was attached by adjusting dot resolution such that the ink attachment amount of the recording area is 200 mg/inch$^2$ to record an image. After the ink was attached, the cloth was discharged and heated at a temperature of 170° C. for one minute to be dried, thereby obtaining a printed matter. However, the ink attachment amount of Example 7 was about 22% of other Examples because Example 6 was an example in which the mass of the ink droplet was reduced.

3.4. Evaluation of Printed Matter 3.4.1. Evaluation of Image Concealment

The L*value of an image of the printed matter was measured by a colorimeter (trade name "Gretag Macbeth Spectrolino", manufactured by X-RITE Inc.) and evaluation was performed based on the following evaluation standard.

Evaluation Standard

AA: 94≤L*
A: 91≤L*<94
B: 89≤L*<91
C: L*<89

3.4.2. Evaluation of Washing Fastness

The printed matter was evaluated by a washing fastness test. The washing fastness test was performed based on "AATCC61 2A, 3A" and evaluation was performed based on the following evaluation standard. Also, the following "2A" indicates that the printed matter was washed at a temperature of 25° C. and "3A" indicates that the printed matter was washed at a temperature of 60° C. A Duty100% portion is the image portion created by the aforementioned printing recording test, a Duty50% portion is the image portion created in the same manner except that the attachment amount is set to the half of Duty100%.

Evaluation Standard

AA: Under the condition of 3A, a film did not fall off in the Duty50% portion.

A: Under the condition of 3A, the film fell off in the Duty50% portion, and the film did not fall off in the Duty100% portion.

B: Under the condition of 3A, the film fell off even in the Duty100% portion, and under the condition of 2A, the film did not fall off even in the Duty50% portion.

C: Under the condition of 2A, the film fell off even in the Duty50% portion.

3.4.3. Evaluation of Intermittency

Under the recording condition of the apparatus used in the aforementioned printing recording test, after the ink was continuously discharged for 5 minutes to an ink receiving portion presumed to be used for a long time and provided from the head to the platen side, and the head was left alone for 1 minute, continuous discharging of the ink for 5 minutes and leaving the head alone for 1 minute were conducted again and the above set was performed for 10 times. After the test was finished, the nozzle which did not discharge the ink was investigated, the number of the nozzle which did not discharge the ink was calculated with respect to the number of the used entire nozzles, and evaluation was performed based on the following standard.

Evaluation Standard

AA: less than 1%
A: equal to or more than 1% and less than 3%
B: equal to or more than 3% and less than 5%
C: equal to or more than 5%

3.4.4. Evaluation of Mist

Under the recording condition of the apparatus used in the aforementioned printing recording test, after the ink was continuously attached to the cloth for 5 minutes, the ratio of the area coated with the ink liquid was measured in the area having a radius of 7 μm from the center of the nozzle row of the nozzle plate of the head, and evaluation was performed based on the following standard.

Evaluation Standard

AA: less than 10%
A: equal to or more than 10% and less than 30%
B: equal to or more than 30% and less than 50%
C: equal to or more than 50%

3.4.5. Evaluation of Color Developing Properties (Strike Through)

The back of the cloth of the image portion of the printed matter obtained in the printing recording test was visually observed and evaluation was performed based on the following standard.

Evaluation Standard
A: No strike through has occurred.
B: Strike through has slightly occurred.
C: Strike through has occurred a lot.

3.5. Evaluation Result

The evaluation result of each Example and Comparative Example is shown in Table 3.

with respect to the ink composition, a large amount of mist was generated and the nozzle surface was contaminated as a result.

As such, according to the ink jet printing method according to the invention, by combining the head and the ink included in the range of the invention, it is clarified that adhesion (washing fastness) of the ink to the cloth can be enhanced, while the ink is prevented from becoming dried from the nozzle surface and discharging reliability is secured; furthermore, generation of the mist can be suppressed at the time of discharging and generation of the strike through of the ink can be prevented, while the image concealment is secured.

TABLE 3

|  | Example 1 | Example 2 | Example 3 | Example 4 | Example 5 | Comparative Example 1 | Example 6 | Example 7 | Example 8 | Comparative Example 2 | Comparative Example 3 | Comparative Example 4 | Comparative Example 5 |
| --- | --- | --- | --- | --- | --- | --- | --- | --- | --- | --- | --- | --- | --- |
| Printer head No. | H1 | H1 | H1 | H1 | H1 | H2 | H3 | H3 | H4 | H1 | H1 | H1 | H1 |
| Ink No. | I1 | I2 | I3 | I4 | I5 | I1 | I1 | I1 | I2 | I6 | I7 | I8 | I9 |
| Weight of ink per one ink droplet [ng/dot] | 7 | 7 | 7 | 7 | 7 | 7 | 31 | 7 | 7 | 7 | 7 | 7 | 7 |
| Color developing properties (strike through) | A | A | A | A | A | A | C | A | A | A | A | A | A |
| Concealment of image | A | A | A | A | A | AA | A | C | A | A | A | A | A |
| Intermittency | A | AA | A | B | B | C | A | A | A | A | B | C | AA |
| Washing fastness | A | B | B | AA | AA | A | A | A | B | C | AA | AA | B |
| Mist | A | B | AA | B | B | A | A | A | B | AA | C | A | C |

As clarified from the result of Table 3, in Examples 1 to 5 and 8, in which the printer heads H1, H3, and H4 in which the length from the pressure chamber to the nozzle surface is 500 μm or more, and the inks I1 to I5 are combined, all of the evaluations were satisfactory. Also, in Example 6 in which the printer head H3 is used, since the maximum mass of the one ink droplet of the discharged ink composition was 31 ng, the strike through was observed. Also, in Example 7, since the nozzle pitch was small, the image concealment was deteriorated as a result.

In contrast, in Comparative Example 1, in which the communicating hole is not included and the head H2 in which the length from the pressure chamber to the nozzle surface is short was used, the ink was dried from the nozzle surface and the intermittency was deteriorated as a result. In Comparative Example 2 in which the printer head H1 was used, since the amount of the solid content of the resin with respect to the used ink composition was small, the washing fastness was deteriorated as a result. In Comparative Example 3, since the amount of the solid content of the resin with respect to the used ink composition was great, a large amount of mist was generated and the nozzle surface was contaminated as a result. In Comparative Example 4, since the ratio of the total content of the organic solvent to the total content of the solid content of the resin was smaller than 0.3, the ink was dried and the intermittency was deteriorated as a result. In Comparative Example 5, since the sum of the total content of the organic solvent and the total content of the solid content of the resin was greater than 37% by mass The present invention is not limited to the aforementioned embodiment, and further can be modified variously. For example, the invention includes the substantially same configuration (for example, a configuration of which a function, method, and result are the same, or a configuration of which a purpose and result are the same) as the configuration stated in the embodiment. In addition, the invention includes a configuration of which a non-essential part stated in the embodiment is substituted. In addition, the invention includes a configuration exhibiting the same effect, or a configuration capable of achieving the same purpose stated in the embodiment. In addition, the invention includes a configuration in which the well-known technology is added to the configuration stated in the embodiment.

Hereinafter, the second invention will be described in more detail using Examples and Comparative Examples and the invention is not limited to these Examples. In addition, "parts" and "%" in Examples and Comparative Examples is on the basis of mass unless otherwise mentioned.

4. Example

4.1. Preparation of Non-White Ink Composition

After the components shown in the lower column of Table 4 were mixed to each other and stirred for 2 hours by a magnetic stirrer, they were filtrated using a membrane filter having a pore diameter of 5 μm to obtain a non-white ink composition of I1 to II1. In addition, the numerical values in Table 4 represent the content of the ink composition (based on mass %), and the upper column of Table represents respective numerical values corresponding to Claim 1. Also, abbreviated names of respective components shown in Table 4 are as follows.

Yellow pigment (trade name "CAB-O-JET 270", manufactured by Cabot Corporation)

Black pigment (trade name "MCF88", manufactured by Mitsui Chemicals, Inc.)

Urethane resin (trade name "Takelac WS-6021", manufactured by Mitsui Chemicals, Inc.)

Surfactant (trade name "BYK-306", manufactured by BYK Japan K.K.)

Additive (trade name "Proxel CRL", manufactured by ICI)

pl, and the sum of the capacity of the communicating hole 127, the nozzle hole 12, and the pressure chamber 20 is 4200 pl.

The head H2 has a structure shown in FIG. 4. That is, the printer head H2 shown in FIG. 4 does not include a communicating hole, and the pressure chamber 20 indicates a space divided by the nozzle plate 10, the communicating plate 110, and the vibrating plate 30, which is a space not including the nozzle hole 12 and the supply port 126. In the head H2, the length from the bottom surface of the pressure chamber 20 to the nozzle surface 13, in other words, the distance of the connection portion 132 is the length of the nozzle hole 12, which is 100 μm, the same as the thickness

TABLE 4

| | Ink No. | | | | | | | | | | |
|---|---|---|---|---|---|---|---|---|---|---|---|
| | I1 | I2 | I3 | I4 | I5 | I6 | I7 | I8 | I9 | I10 | I11 |
| Solid content of resin | 10 | 3 | 3 | 12 | 12 | 2 | 14 | 12 | 4 | | 10 |
| Total amount of organic solvent | 20 | 25 | 18 | 10 | 20 | 16 | 15 | 7 | 33 | 20 | |
| Total amount of organic solvent/total amount of solid content of resin | 2.00 | 8.33 | 6.00 | 0.83 | 1.67 | 8.00 | 1.07 | 0.58 | 8.25 | | 0.00 |
| Total amount of solid content of resin + total amount of organic solvent | 30.0 | 28.0 | 21.0 | 22.0 | 32.0 | 18.0 | 29.0 | 19.0 | 37.0 | 20.0 | 10.0 |
| Solid content of yellow pigment | 5 | 5 | | 5 | 5 | 5 | 5 | 5 | 5 | 5 | 5 |
| Solid content of black pigment | | | 5 | | | | | | | | |
| Solid content of urethane resin | 10 | 3 | 3 | 12 | 12 | 2 | 14 | 12 | 4 | | 10 |
| Glycerin | 9 | 11 | 8 | 6 | 9 | 7 | 6 | 3 | 14 | 9 | |
| Triethylene glycol | 5 | 6 | 5 | 2 | 5 | 4 | 4 | 2 | 9 | 5 | |
| Propylene glycol | 4 | 6 | 4 | 1 | 4 | 4 | 4 | 1 | 8 | 4 | |
| Triethylene glycol monobutyl ether | 2 | 2 | 1 | 1 | 2 | 1 | 1 | 1 | 2 | 2 | |
| Surfactant | 0.3 | 0.3 | 0.3 | 0.3 | 0.3 | 0.3 | 0.3 | 0.3 | 0.3 | 0.3 | 0.3 |
| Various additives | 0.3 | 0.3 | 0.3 | 0.3 | 0.3 | 0.3 | 0.3 | 0.3 | 0.3 | 0.3 | 0.3 |
| Water | 64.4 | 66.4 | 73.4 | 72.4 | 62.4 | 76.4 | 65.4 | 75.4 | 57.4 | 74.4 | 84.4 |
| Total | 100 | 100 | 100 | 100 | 100 | 100 | 100 | 100 | 100 | 100 | 100 |

4.2. Preparation of Ink Jet Printing Apparatus

As the ink jet printing apparatus including the printer head illustrated in FIGS. 1 to 3 described above, a modified device of SC-F2000 (manufactured by Seiko Epson Corp.) was prepared. Three types of the heads H1 to H4 shown in Table 5 were used as the head.

TABLE 5

| | Printer head No. | | | |
|---|---|---|---|---|
| | H1 | H2 | H3 | H4 |
| Length from pressure chamber to nozzle surface [μm] | 1000 | 100 | 1000 | 500 |
| Nozzle pitch [dpi] | 300 | 360 | 180 | 300 |
| Capacity of pressure chamber [pl] | 2900 | 2900 | 3700 | 2900 |
| Total capacity of nozzle hole, communicating hole, and pressure chamber | 4200 | 3100 | 5000 | 3600 |

Here, the head H1 has a structure shown in FIG. 3 and the length from the bottom surface of the pressure chamber 20 to the nozzle surface 13, in other words, the distance of the connection portion 132 (d1+d2) is 1000 μm, the nozzle pitch is 300 dpi, the capacity of the pressure chamber 20 is 2900 of the nozzle plate 10. Also, the nozzle pitch is 360 dpi, the capacity of the pressure chamber 20 is 2900 pl, and the sum of the capacity of the nozzle hole 12 and the pressure chamber 20 is 3100 pl.

The head H3 is a head having a similar structure to the head H1, the capacity of the pressure chamber is greater, and the nozzle density is lower than that of the head H1. That is, the distance of the connection portion 132 is 1000 μm, the nozzle pitch is 180 dpi, the capacity of the pressure chamber 20 is 3700 pl, and the sum of the capacity of the communicating hole 127, the nozzle hole 12, and the pressure chamber 20 is 5000 pl.

The head H4 is a head having a similar structure to the head H1, the distance of the connection portion 132 is 500 μm, shorter than that of the head H1, and the capacity of the nozzle pitch and the pressure chamber 20 is the same as that of the head H1. That is, the nozzle pitch is 300 dpi, the capacity of the pressure chamber 20 is 2900 pl, and the sum of the capacity of the communicating hole 127, the nozzle hole 12 and the pressure chamber 20 is 3600 pl since the distance of the connection portion 132 is shorter than that of the head H1. In addition, in all of the heads, the nozzle size of the nozzle hole 12 is 20 μm.

4.3. Printing Recording Test

A printing recording test was performed on a cloth (manufactured by Hanesbrands Inc., heavy weight, cotton 100%, white texture). The cloth was set into the aforementioned printer, and the ink was discharged from the head to attach the ink to the cloth. The mass of the ink per one droplet was set as the values shown in Table 6, and the ink was attached by adjusting dot resolution such that the ink attachment amount of the recording area is 15 mg/inch$^2$ to record an image. After the ink was attached, the cloth was discharged and heated at a temperature of 170° C. for one minute to be dried, thereby obtaining a printed matter. However, the ink attachment amount of Example 7 was about 22% of other Examples because Example 6 was an example in which the mass of the ink droplet was reduced.

4.4. Evaluation of Printed Matter 4.4.1. Evaluation of Color Developing Intensity of Image The L*value of an image of the printed matter was measured by a colorimeter (trade name "Gretag Macbeth Spectrolino", manufactured by X-RITE Inc.) and evaluation was performed based on the following evaluation standard.

Evaluation Standard
AA: 94≤L*
A: 91≤L*<94
B: 89≤L*<91
C: L*<89

4.4.2. Evaluation of Washing Fastness

The printed matter was evaluated by a washing fastness test. The washing fastness test was performed based on "AATCC61 2A, 3A" and evaluation was performed based on the following evaluation standard. Also, the following "2A" indicates that the printed matter was washed at a temperature of 25° C. and "3A" indicates that the printed matter was washed at a temperature of 60° C. A Duty100% portion is the image portion created by the aforementioned printing recording test, a Duty50% portion is the image portion created in the same manner except that the attachment amount is set to the half of Duty100%.

Evaluation Standard
AA: Under the condition of 3A, a film did not fall off in the Duty50% portion.
A: Under the condition of 3A, the film fell off in the Duty50% portion, and the film did not fall off in the Duty100% portion.
B: Under the condition of 3A, the film fell off even in the Duty100% portion, and under the condition of 2A, the film did not fall off even in the Duty50% portion.
C: Under the condition of 2A, the film fell off in the Duty50% portion, and the film did not fall off in the Duty100% portion.
D: Under the condition of 2A, the film fell off even in the Duty100% portion.

4.4.3. Evaluation of Intermittency

Under the recording condition of the apparatus used in the aforementioned printing recording test, after the ink was continuously discharged for 5 minutes to an ink receiving portion presumed to be used for a long time and provided from the head to the platen side, and the head was left alone for 1 minute, continuous discharging of the ink for 5 minutes and leaving the head alone for 1 minute were conducted again and the above set was performed for 10 times. After the test was finished, the nozzle which did not discharge the ink was investigated, the number of the nozzle which did not discharge the ink was calculated with respect to the number of the used entire nozzles, and evaluation was performed based on the following standard.

Evaluation Standard
AA: less than 1%
A: equal to or more than 1% and less than 3%
B: equal to or more than 3% and less than 5%
C: equal to or more than 5% and less than 8%
D: equal to or more than 8%

4.4.4. Evaluation of Mist

Under the recording condition of the apparatus used in the aforementioned printing recording test, after the ink was continuously attached to the cloth for 5 minutes, the ratio of the area coated with the ink liquid was measured in the area having a radius of 7 μm from the center of the nozzle row of the nozzle plate of the head, and evaluation was performed based on the following standard.

Evaluation Standard
AA: less than 10%
A: equal to or more than 10% and less than 30%
B: equal to or more than 30% and less than 50%
C: equal to or more than 50%

4.4.5. Evaluation of Color Developing Properties (Bleeding)

The image portion of the printed matter obtained in the printing recording test was visually observed. Here, the attachment amount of the aforementioned printing recording condition was set to Duty100%, a solid pattern was printed under a condition of Duty10% and resolution 1440×720 dpi and observed by an optical microscope having a magnification of 15, and evaluation was performed based on the following standard.

Evaluation Standard
AA: Dots scarcely bled.
A: Dots slightly bled.
B: A half of the dots bled.
C: Most of the dots bled.

4.5. Evaluation Result

The evaluation result of each Example and Comparative Example is shown in Table 6.

TABLE 6

| | Example 1 | Example 2 | Example 3 | Example 4 | Example 5 | Comparative Example 1 | Example 6 | Example 7 | Example 8 |
|---|---|---|---|---|---|---|---|---|---|
| Printer head No. | H1 | H1 | H1 | H1 | H1 | H2 | H3 | H3 | H1 |
| Ink No. | I1 | I2 | I3 | I4 | I5 | I1 | I1 | I1 | I6 |
| Weight of ink per one ink droplet [ng/dot] | 7 | 7 | 7 | 7 | 7 | 7 | 31 | 7 | 7 |
| Color developing properties (bleeding) | A | A | A | A | A | A | C | A | A |
| Color developing intensity | A | A | A | A | A | A | A | C | A |

TABLE 6-continued

| | | | | | | | | | |
|---|---|---|---|---|---|---|---|---|---|
| Intermittency | A | AA | AA | B | A | C | A | A | AA |
| Washing fastness | A | B | B | AA | AA | A | A | A | C |
| Mist | A | A | AA | AA | B | A | A | A | AA |

| | | Example 9 | Example 10 | Example 11 | Example 12 | Comparative Example 2 | Comparative Example 3 |
|---|---|---|---|---|---|---|---|
| | Printer head No. | H1 | H1 | H1 | H4 | H1 | H1 |
| | Ink No. | I7 | I8 | I9 | I2 | I10 | I11 |
| | Weight of ink per one ink droplet [ng/dot] | 7 | 7 | 7 | 7 | 7 | 7 |
| | Color developing properties (bleeding) | A | A | A | A | A | A |
| | Color developing intensity | A | A | A | A | A | A |
| | Intermittency | B | C | AA | A | AA | D |
| | Washing fastness | AA | AA | B | B | D | A |
| | Mist | C | AA | C | A | AA | C |

As clarified from the result of Table 6, in Examples 1 to 5 and 12, in which the printer heads H1, H3, and H4 in which the length from the pressure chamber to the nozzle surface is 500 μm or more, and the inks I1 to I5 are combined, all of the evaluations were satisfactory. Also, in Example 6, since the maximum mass per one droplet of the discharged ink composition was 31 ng, bleeding was observed in the image. Also, in Example 7, since the nozzle pitch was small, the color developing intensity of the image was relatively deteriorated as a result.

In Example 8, the printer head H1 was used, since the amount of the solid content of the resin with respect to the used ink composition was small, the washing fastness was relatively deteriorated as a result. In Example 9, since the amount of the solid content of the resin with respect to the used ink composition was great, the intermittency was slightly deteriorated, and generation of the mist resulted in a contamination of the nozzle surface. In Example 10, since the ratio of the total content of the organic solvent with respect to the total content of the solid content of the resin was small, it was observed that the ink was dried and the intermittency was relatively deteriorated as a result. In Example 11, since the sum of the total content of the organic solvent and the total content of the solid content of the resin was greater than 35% by mass with respect to the ink composition, the washing fastness was slightly deteriorated and generation of the mist resulted in a contamination of the nozzle surface.

In contrast, in Comparative Example 1, in which the communicating hole is not included and the head H2 in which the length from the pressure chamber to the nozzle surface is short was used, the ink was dried from the nozzle surface and the intermittency was deteriorated as a result. In Comparative Example 2 in which the ink not including the resin was used, the washing fastness was deteriorated as a result. In Comparative Example 3 in which the ink not including the organic solvent was used, drying of the ink from the nozzle surface not only deteriorated the intermittency, but also generation of the mist in a large amount resulted in a contamination of the nozzle surface.

As such, according to the ink jet printing method according to the invention, by using the head included in the range of the invention, it is clarified that adhesion (washing fastness) of the ink to the cloth can be enhanced, while the ink is prevented from becoming dried from the nozzle surface and the discharge reliability is secured; furthermore, generation of the mist can be suppressed at the time of discharging and generation of the bleeding of the ink can be prevented, while the color developing intensity of the image is secured. Also, it is clarified that by using the head included in the range of the invention and further adjusting the composition of the ink, each of the effects can be further enhanced.

The present invention is not limited to the aforementioned embodiment, and further can be modified variously. For example, the invention includes the substantially same configuration (for example, a configuration of which a function, method, and result are the same, or a configuration of which a purpose and result are the same) as the configuration stated in the embodiment. In addition, the invention includes a configuration of which a non-essential part stated in the embodiment is substituted. In addition, the invention includes a configuration exhibiting the same effect, or a configuration capable of achieving the same purpose stated in the embodiment. In addition, the invention includes a configuration in which the well-known technology is added to the configuration stated in the embodiment.

The entire disclosure of Japanese Patent Application Nos. 2015-088119, filed Apr. 23, 2015; 2015-088120, filed Apr. 23, 2015; 2015-157909, filed Aug. 10, 2015 and 2015-157910, filed Aug. 10, 2015 are expressly incorporated by reference herein.

What is claimed is:

1. An ink jet printing method comprising:
attaching a reaction liquid including an aggregating agent for aggregating or thickening a component of an ink composition to a cloth;
attaching the ink composition to the cloth by using a printer head which has a nozzle discharging the ink composition, a pressure chamber for imparting pressure to the ink composition to cause the nozzle to discharge the ink composition, a connection portion connecting the pressure chamber and the nozzle, and in which a distance of the connection portion is 500 μm or more, and the distance of the connection portion being from a portion of the pressure chamber where the ink flows out from a pressure chamber to the nozzle side to the nozzle, wherein the ink composition includes a resin as a solid content and an organic solvent, the solid content is in the range of 3.0% by mass to 13% by mass with respect to a total mass of the ink composition, a ratio of a total content of the organic solvent to a total content of the solid content is 2.5 or more, and a sum of the total content of the solid content and the total content of the organic solvent is 20% by mass to 35% by mass with respect to the total mass of the ink composition.

2. The ink jet printing method according to claim 1, wherein, in the attaching of the ink composition, the maximum mass is 30 ng or less per one ink droplet of the discharged ink composition.

3. The ink jet printing method according to claim 1, wherein, in the printer head, the total capacity of the pressure chamber per pressure chamber and the connection portion is 4200 pl to 6200 pl.

4. The ink jet printing method according to claim 1, wherein the capacity of the pressure chamber per pressure chamber is 3700 pl or less.

5. The ink jet printing method according to claim 1, wherein the printer head includes a communicating plate provided with a communicating hole which configures a part of the connection portion.

6. The ink jet printing method according to claim 1, wherein the ink composition is a non-white ink composition including a non-white pigment.

7. The ink jet printing method according to claim 1, wherein the printer head includes a plurality of nozzles discharging the ink composition in a row, and the nozzle density in the row direction is 200 dpi or more.

8. The ink jet printing method according to claim 1, wherein the maximum ink attachment amount to the cloth is 40 mg/inch$^2$ or less.

* * * * *